United States Patent [19]
Andou et al.

[11] Patent Number: 5,740,170
[45] Date of Patent: Apr. 14, 1998

[54] METHOD AND APPARATUS FOR PROVIDING COMMUNICATION BETWEEN GROUPED RECEIVERS AND MANAGEMENT THEREOF

[75] Inventors: Nobuyoshi Andou, Sagamihara; Masayuki Orimo, Kawasaki; Shigeki Hirasawa, Sagamihara; Yusuke Hino, Hadano; Hisashi Hashimoto; Hiroshi Fujise, both of Yokohama, all of Japan

[73] Assignee: Hitachi, Ltd., Tokyo, Japan

[21] Appl. No.: 597,966

[22] Filed: Feb. 7, 1996

[30] Foreign Application Priority Data

Jul. 7, 1995 [JP] Japan ................................ 7-019291

[51] Int. Cl.$^6$ .................................................. H04L 12/00
[52] U.S. Cl. .................................................. 370/390
[58] Field of Search .................................. 370/312, 390; 395/200.01, 200.15, 200.16; 340/825.03, 825.08, 825.53

[56] References Cited

U.S. PATENT DOCUMENTS

| | | | |
|---|---|---|---|
| 4,864,559 | 9/1989 | Perlman | 370/256 |
| 5,079,767 | 1/1992 | Perlman | 370/408 |
| 5,103,444 | 4/1992 | Leung et al. | 370/432 |
| 5,289,460 | 2/1994 | Drake, Jr. et al. | 370/245 |
| 5,361,256 | 11/1994 | Doeringer et al. | 370/390 |
| 5,557,745 | 9/1996 | Perlman et al. | 395/200.2 |
| 5,566,181 | 10/1996 | Huang et al. | 370/94.1 |

Primary Examiner—Lance Leonard Barry, Esq.
Attorney, Agent, or Firm—Antonelli, Terry, Stout, & Kraus,LLP

[57] ABSTRACT

An information processing system and a communication method performed in the information processing system for performing data transmission effectively. The information processing system includes a plurality of information processing apparatuses and a communication line for interconnecting the plurality of information processing apparatuses. A sending information processing apparatus, when sending information to the plurality of information processing apparatuses, sends transmission information to one of the plurality of information processing apparatuses. The one information processing apparatus sends the received transmission information to the other information processing apparatuses of the plurality of information processing apparatuses.

18 Claims, 14 Drawing Sheets

FIG. 6

| DESTINATION GROUP IDENTIFIER | DESTINATION ADDRESS | BUFFER IDENTIFIER | PROCESSING EXECUTION SECTION IDENTIFIER |
|---|---|---|---|
| GROUP-1 | 4235D | 21 | AP-1 |
| GROUP-1 | 147C6 | 17 | AP-2 |
| GROUP-1 | 3221F | 60 | AP-3 |
| GROUP-2 | 57C10 | 75 | AP-4 |
| --- | --- | --- | --- |

510

511 512 513 514

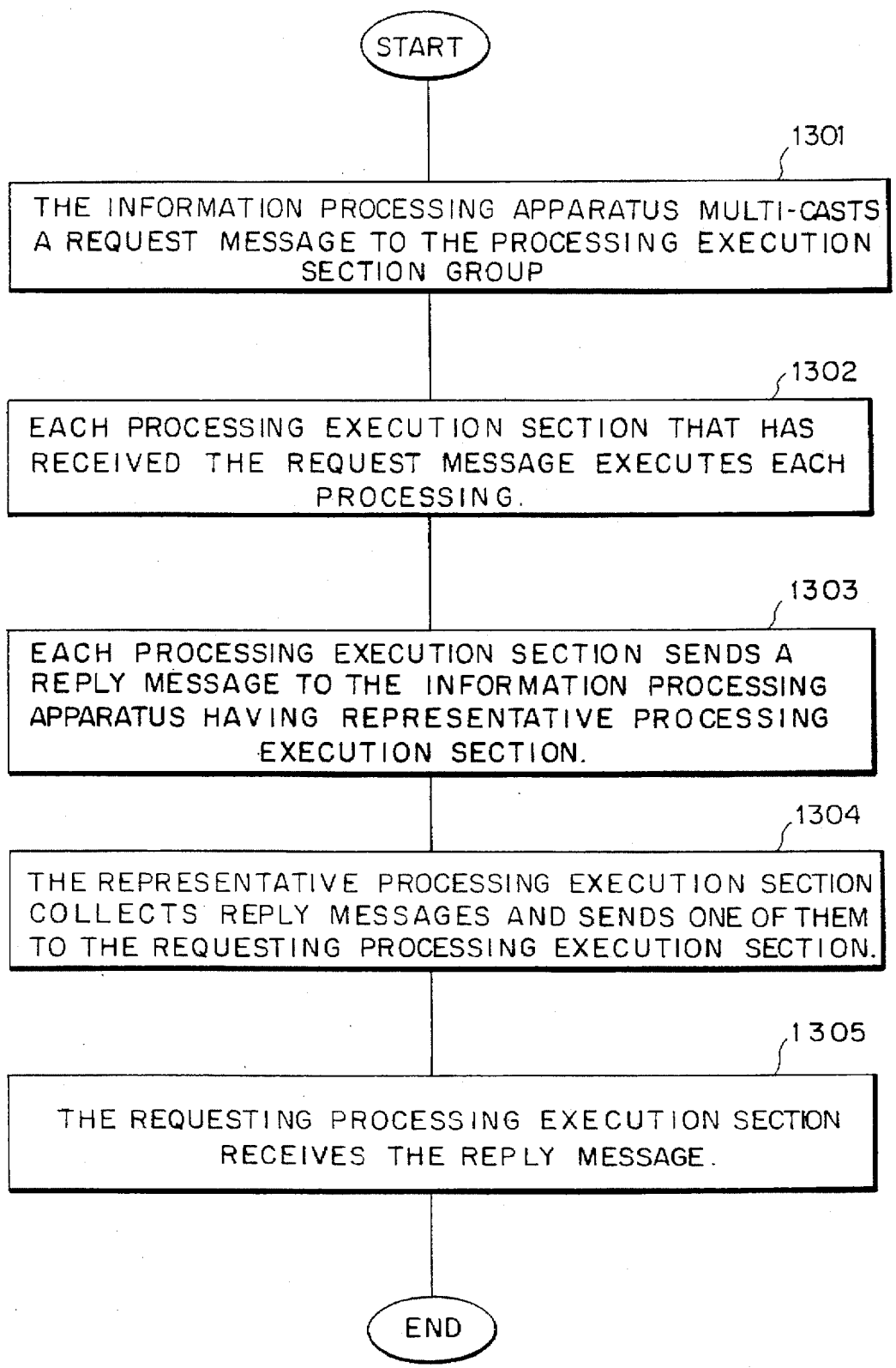

METHOD AND APPARATUS FOR PROVIDING COMMUNICATION BETWEEN GROUPED RECEIVERS AND MANAGEMENT THEREOF

BACKGROUND OF THE INVENTION

The present invention relates to an information processing system having a plurality of information processing apparatuses, such as computers, interconnected via a network. More particularly, the present invention relates to a method and an apparatus for sending and receiving information involved in information multi-casting performed via a network between information processing apparatuses.

A conventional information processing system in which information is transmitted via a network, such as a distributed processing system, uses two types of methods of multi-casting data between information processing apparatuses; namely, repeating uni-casting a plurality of times and broadcasting.

In the method in which uni-casting is repeated multiple times, an information processing apparatus transmits data to each of a plurality of information processing apparatuses by addressing each of the information processing apparatuses to cause each information processing apparatus to receive the transmitted data. Thus, the information processing apparatus performs data transmission on a one to one basis. This operation is performed on all necessary receiving apparatuses, eventually resulting in multi-casting. If uni-casting is used for communication with other information processing apparatuses on a network, the communication may be made by setting a communication path between the communicating information processing apparatuses.

The communication path as referred to herein denotes not only physical connections between information processing apparatuses but also apparatuses for reception acknowledgment and response between the information processing apparatuses performing transmit-receive operations and message retransmission necessary when a reception error has been encountered. In this case, a receiving information processing apparatus returns the response for acknowledging message reception to a sending information processing apparatus, thereby enhancing the certainty of data-transmission.

In broadcasting, data transmitted from an information processing apparatus on a network is received by all other information processing apparatuses on the network. Further, in broadcasting, setting the communication path excessively increases network load because the communication path needs to be available to each of the other information processing apparatuses on the network. Therefore, normally, the communication is performed without setting the communication path. This lowers the certainty of data transmission in broadcasting as compared with the uni-casting.

According to the above-described related technology, the repetition of uni-casting multiple times by the sending information processing apparatus increases transmission load of the sending information processing apparatus. In addition, each sending information processing apparatus needs to manage addresses of all receiving information processing apparatuses, so that, if a configuration of the group of receiving information apparatuses has been changed, the change information needs to be instantaneously passed to all sending information processing apparatuses.

Consequently, it is difficult to cope on-line with the change in group configuration of the receiving information processing apparatuses. It is also necessary, when the change in group configuration of the receiving information processing apparatuses takes place, to change the processing in the sending information processing apparatuses in the same manner.

Broadcasting also has a security problem in addition to lower data transmission certainty.

SUMMARY OF THE INVENTION

An object of the present invention is to provide a technique for efficiently performing data transmission in an information processing system.

To achieve the above object, the present invention provides a communication method directed to a first feature of the present invention, wherein the communication method is performed in an information processing system having a plurality of information processing apparatuses and a communication line for interconnecting the plurality of information processing apparatuses.

In the communication method directed to the first feature of the present invention information from one processing execution section of an information processing apparatus is sent to a plurality of processing execution sections of the plurality of information processing apparatuses. The sending information processing apparatus sends transmission information to one information processing apparatus of the plurality of information processing apparatuses, and the information processing apparatus that has received the transmission information sends the transmission information to others of the plurality of information processing apparatuses.

Further, the present invention provides a communication method directed to a second feature of the present invention wherein the communication method is performed in an information processing system having a plurality of information processing apparatuses and a communication line for interconnecting the plurality of information processing apparatuses.

In the communication method directed to the second feature of the present invention information from one of the plurality of information processing apparatuses is sent to others of the plurality of information processing apparatuses, wherein the plurality of information processing apparatuses are grouped into a plurality of groups. The sending information processing apparatus selects one information processing apparatus from a group of information processing apparatuses as a representative information processing apparatus and sends transmission information to the selected information processing apparatus. The selected information processing apparatus that has received the transmission information sends the received transmission information to the other information processing apparatuses in the group to which the selected information processing apparatus belongs.

Further still, the present invention provides a third feature of the present invention, wherein the communication method is performed in an information processing system including a plurality of information processing apparatuses, each having at least one processing execution section and a communication line for interconnecting the plurality of information processing apparatuses.

In the communication method directed to the third feature of the present invention, information from one processing execution section of one of the plurality of information processing apparatuses is sent to a plurality of processing execution sections of the other information processing apparatuses. The plurality of processing execution sections of the plurality of information processing apparatuses are grouped into a plurality of groups. A sending information processing apparatus selects one of processing execution sections of a group of processing execution sections as a representative processing execution section and sends transmission information to the information processing apparatus having the representative processing execution section. The information processing apparatus that has received the transmission information sends the received transmission information to the other information processing apparatuses having processing execution sections in the group to which the representative processing execution section belongs.

Even further still, the present invention provides a communication method directed to a fourth aspect of the present invention, wherein the communication method is performed in an information processing system including a plurality of information processing apparatuses each having at least one processing execution section and a communication line for interconnecting the plurality of information processing apparatuses.

In the communication method directed to the fourth aspect of the present invention, information from one processing execution section of one of the plurality of information processing apparatuses is sent to a plurality of processing execution sections of other information processing apparatuses. The plurality of information processing apparatuses are grouped into a plurality of groups. A representative processing execution section is uniquely determined in each group. A sending information processing apparatus sends transmission information to the information processing apparatus having the representative processing execution section, and the information processing apparatus that has received the transmission information sends the received transmission information to the other information processing apparatuses having the processing execution sections in the group to which the representative processing execution section belongs.

Still even further yet, the present invention provides a communication method directed to a fifth feature of the present invention, wherein the communication method is performed in an information processing system including a plurality of information processing apparatuses each having at least one processing execution section and a communication line for interconnecting the plurality of information processing apparatuses.

In the communication method directed to the fifth feature of the present invention, information from one processing execution section of one of the plurality of information processing apparatuses is sent to a plurality of processing execution sections of the other information processing apparatuses. The plurality of information processing apparatuses are grouped into a plurality of groups and the plurality of processing execution sections of the plurality of information processing apparatuses are grouped into a plurality of groups. A representative processing execution section is uniquely determined in a group. A sending information processing apparatus sends transmission information to the information processing apparatus having one processing execution section arbitrarily selected from the plurality processing execution sections of a group. The information processing apparatus that has received the transmission information transfers, if the information processing apparatus does not have the representative processing execution section of the group, the received transmission information to the information processing apparatus having the representative processing execution section. The information processing apparatus having the representative processing execution section sends the received transmission information to the other information processing apparatuses having the processing execution sections in the group.

Even further still, the present invention provides a communication method directed to a sixth feature of the present invention, wherein the communication method is performed in an information processing system according to any of above-described third through fifth features of the present invention, wherein each of the plurality of information processing apparatuses has an information storage section for storing information about a destination information processing apparatus to which the received transmission information is transferred. The information processing apparatus having the representative processing execution section receives change information of a processing execution section group, changes the information stored in the information storage section based on the change information and sends resultant change information to the information processing apparatuses having the other processing execution sections in the group. Each of information processing apparatuses not having the representative processing execution section receives the resultant change information and changes the information stored in the information storage section thereof.

Yet even further, the present invention provides a communication method directed to a seventh feature of the present invention, wherein the communication method is performed in an information processing system according to any of above-described third through fifth features of the present invention, wherein one processing execution section of one of the plurality of information processing apparatuses sends request information for requesting the processing execution sections in a group for reply information. The information processing apparatuses having the processing execution sections that have received the request information return the reply information to the information processing apparatus having the representative processing execution section. The information processing apparatus having the representative processing execution section gathers the reply information and returns one or all pieces of the reply information to the information processing apparatus having the processing execution section that has sent the request information.

The above-described first through seventh features of the present invention can be embodied as a computer program which is stored on a computer readable medium such as a CD ROM, a floppy disk, in a logic circuit or the like.

The computer program when executed by a computer operated as a receiver performs the steps of the computer program most efficiently when the computer is a workstation having a Unix operating system or a PC having an OS2 or Windows95 operating system. The computer program can be executed by a PC having a MS-DOS operating system but with some difficulty. Most particularly, the PC should, through its operating system, have a multi-tasking function.

The computer program, when executed by a computer operated as a sender, performs the steps of the computer program most efficiently when the computer is a workstation having a Unix operating system or a PC having a MS-DOS, OS2 or Windows95 operating system. The computer when operated as a sender does not require a multi-tasking function.

To achieve the above object, the present provides an information processing system directed to an eighth feature of the present invention, wherein the information processing system includes a plurality of information processing apparatuses each having at least one processing execution section and a communication line for interconnecting the plurality of information processing apparatuses. The plurality of processing execution sections of the plurality of information processing apparatuses are grouped into a plurality of a groups.

Information from one of the processing execution sections of one of the plurality of information processing apparatuses is sent to the plurality of other processing execution sections of the plurality of information processing apparatuses. The sending information processing apparatus sends transmission information to one of the plurality of information processing apparatuses. The information processing apparatus that has received the transmission information sends the received transmission information to the other information processing apparatuses.

Each of the plurality of information processing apparatuses includes apparatus for arbitrarily selecting one of the plurality of processing execution sections in a group as a representative processing execution section and sending the information coming from one of the plurality of processing execution sections to the information processing apparatus having the representative processing execution section along with an identifier for indicating a destination group, apparatus for receiving the transmission information and transmitting, based on the identifier for indicating the destination group attached to the transmission information, the received transmission information to the processing execution section in the destination group in the information processing apparatus, and apparatus for transferring, based on the identifier for indicating the destination group attached to the transmission information, the received transmission information to other information processing apparatus having the processing execution sections in that group.

Further, the present invention provides an information processing system directed to a ninth feature of the present invention, wherein the information processing system includes a plurality of information processing apparatuses each having at least one processing execution section and a communication line for interconnecting the plurality of information processing apparatuses. A plurality of processing execution sections of the plurality of information processing apparatuses are grouped into a plurality of groups and one of the plurality of processing executions sections in a group is uniquely determined as a representative processing execution section.

Information from one processing execution section of one of the plurality of information processing apparatuses is sent to the plurality of other processing execution sections of the plurality of information processing apparatuses. The sending information processing apparatus sends transmission information to one of the plurality of receiving information processing apparatuses, and the information processing apparatus that has received the transmission information sends the received transmission information to the other receiving information processing apparatuses.

Each of the plurality of information processing apparatuses includes apparatus for sending the information coming from one of the plurality of processing execution sections to the information processing apparatus having the representative processing execution section along with an identifier for indicating a destination group and apparatus for receiving the transmission information and transmitting, based on the identifier for indicating the destination group attached to the transmission information, the received transmission information to the processing execution section in the destination group of the information processing apparatus. The information processing apparatus having the representative processing execution section has apparatus for transferring, based on the identifier for indicating the destination group attached to the transmission information, the received transmission information to other information processing apparatuses having the processing execution sections in that group.

Still further, the present invention provides an information processing system directed to a tenth feature of the present invention, wherein the information processing system includes a plurality of information processing apparatuses each having at least one processing execution section and a communication line for interconnecting the plurality of information processing apparatuses. A plurality of processing execution sections of the plurality of information processing apparatuses are grouped into a plurality of groups and one of the plurality of processing executions sections in a group is uniquely determined as a representative processing execution section.

Information from one processing execution section of one of the plurality of information processing apparatuses is sent to the plurality of other processing execution sections of the plurality of information processing apparatuses.

The sending information processing apparatus sends transmission information to one of the plurality of receiving information processing apparatuses, and the information processing apparatus that has received the transmission information sends the received transmission information to the other receiving information processing apparatuses.

Each of the plurality of information processing apparatuses includes apparatus for sending the information coming from one of the plurality of processing execution sections to the information processing apparatus having one processing execution section selected from the processing execution sections in a group along with an identifier for indicating a destination group and apparatus for receiving the transmission information and transmitting, based on the identifier for indicating the destination group attached to the transmission information, the received transmission information to the processing execution section in the destination group of the information processing apparatus. Each of the information processing apparatuses not having the representative processing execution section has apparatus for transferring, based on the identifier for indicating the destination group attached to the received transmission information, the received transmission information to the information processing apparatuses having the representative processing execution section in that group. The information processing apparatus having the representative processing execution section has apparatus for transferring, based on the identifier for indicating the destination group attached to the received transmission information, the received transmission information to the other information processing apparatuses having the processing executions sections in that group.

Still further yet, the present invention provides an information processing system directed to an eleventh feature of the present invention according to any of the above-described eighth through tenth features of the present invention, wherein each of the plurality of information processing systems has an information storage section for storing information about a destination information processing apparatus to which the received transmission information is transferred. The information processing apparatus having the representative processing execution section has apparatus for receiving change information of a processing execution section group and changing the information stored in the information storage section of the information processing apparatus based on the change information and apparatus for sending the change information to the information processing apparatuses having the processing execution sections in that group. Each of the information processing apparatuses not having the representative processing execution section has apparatus for receiving the change information and changing the information stored in the information storage section of the information processing apparatus based on the change information.

Even further, the present invention provides an information processing system directed to a twelfth feature of the present invention according to any of the above-described eight through tenth features of the present invention. Each of the plurality of information processing apparatuses includes apparatus for sending request information for requesting the processing execution sections in a group to return reply information. Each information processing apparatus having the processing execution section that has received the request information has apparatus for returning the reply information to the information processing apparatus having the representative processing execution section. The information processing apparatus having the representative processing execution section has apparatus for gathering the reply information and returning one or all pieces of the reply information to the information processing apparatus having the processing execution section that sent the request information.

According to the above-described first through fifth and eighth through tenth features of the present invention, in data transmission of an information processing system, a sending information processing apparatus sends data to one information processing apparatus of a group of receiving information processing apparatuses. The information processing apparatus that has received the data acts for all receiving information processing apparatuses in the group and multi-casts the received data to all receiving information processing apparatuses in the group.

The above-described fifth and eighth features of the present invention permit mitigation in the transmission load of the sending information processing apparatus, thereby realizing effective multi-casting even when the throughput of the sending information processing apparatus is low or the memory thereof is small in capacity.

In addition, the above-described structure makes relatively small the total number of communication paths to be set if the number of information processing apparatuses that send data to a group is larger than the number of information processing apparatuses that belong to the group and each of the communication paths is set between two of the information processing apparatuses.

Further, the sending information processing apparatus may multi-cast data to a group of information processing apparatuses always in the same transmission processing regardless of the group constitution of the destination.

Still further, according to the above-described sixth and eleventh features of the present invention, the address control of a group is performed by a receiving information processing apparatus and the change in the configuration of a group is also performed by the receiving information processing apparatus. Thus, if a change occurs in the system configuration such as a group configurational change, the change may be processed only by changing the address information on the group controlled by each receiving information processing apparatus. Therefore, the sending information processing apparatus may multi-cast data to the group always in the same transmission processing.

Still further yet, according to the above-described seventh and twelfth features of the present invention, when making a request for requiring a plurality of information processing apparatuses to reply, the representative information processing apparatus selects one of a plurality of response information processing apparatus to respond to the requesting information processing apparatus, so that, it is not necessary for the requesting information processing apparatus to receive the response information from all receiving information processing apparatuses.

BRIEF DESCRIPTION OF THE DRAWINGS

The present invention will be more apparent from the following detailed description, when taken in conjunction with the accompanying drawings, in which:

FIG. 6 is a diagram illustrating the constitution of the transmission information table held by the data transmission manager;

FIG. 15 is a flowchart indicating the processing procedure, of the information processing apparatus that executes the request reply processing in the fourth embodiment.

DETAILED DESCRIPTION OF PREFERRED EMBODIMENTS

Figure 1:
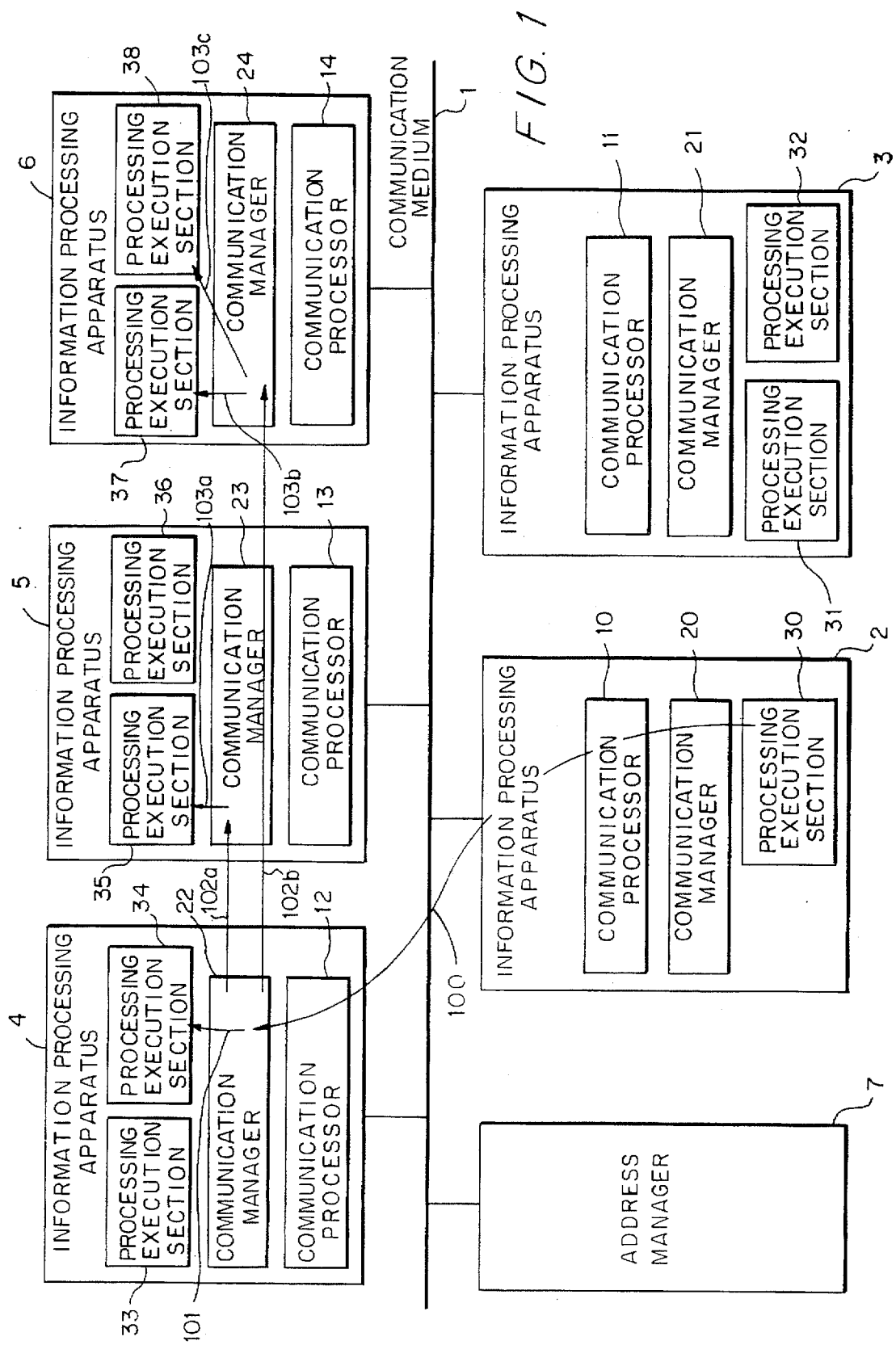
FIG. 1 is a block diagram illustrating a general constitution of the information processing system practiced as the first embodiment of the invention and the flow of multi-cast messages to be realized by the invention.

Referring to FIG. 1, there is shown a block diagram illustrating a general constitution of an information processing apparatus practiced as a first embodiment of the present invention and a flow of a multi-cast message realized by the embodiment.

In FIG. 1, reference numeral 1 indicates a communication medium, reference numerals 2 through 6 indicate information processing apparatuses, and reference numeral 7 indicates an address manager. Each of the information processing apparatuses 2 through 6 is connected to the communication medium 1 to communicate with each other. For the communication medium 1, communication apparatuses such as a Local Area Network (LAN), a Wide Area Network (WAN), and a wireless network are available.

The address manager 7 stores the addresses of the information processing apparatuses 2 through 6, the addresses of processing execution sections 30–38, and information indicating to which processing execution section group a processing execution section belongs. For the address manager 7, a server such as a name server or a directory server may be used.

The information processing apparatus 2 includes a communication processor 10, a communication manager 20, and a processing execution section 30. The information processing apparatuses 2 through 6 are the same in constitution. Communication processors 10 through 14 are the same in function. Communication managers 20 through 24 are the same in function. Processing execution sections 30 through 38 are the same in function.

It should be noted that, in FIG. 1, one information processing apparatus includes only one of the communication processors 10 through 14 and only one of the communication managers 20 through 24. However, one information processing apparatus may include a plurality of communication processor and/or communication managers. Also, one information processing apparatus may include a plurality of processing execution sections.

The processing execution sections belong to processing execution sections groups. Each group consists of one representative processing execution section and one or more non-representative processing execution sections. One processing execution section may belong to a plurality of groups. A plurality of processing execution sections in a group may be arranged in separate information processing apparatuses rather than a single information processing apparatus. Any processing execution section may be the representative processing execution section. The representative processing execution section is not required to perform special processing and need not be aware that the representative processing execution section is to be representative.

Which processing execution section is to be representative is determined in several ways. In the first embodiment, a processing execution section arbitrarily selected by the processing execution section 30 that sends a message to the group becomes the representative processing execution section. A plurality of processing execution sections that send a message to a group may select respective representative processing execution sections. Further, one processing execution section may select a different representative processing execution section every time the former makes a transmission. Alternatively, several sending processing execution sections may determine a common representative processing execution section in advance and send messages to that common representative processing execution section.

Figure 2:
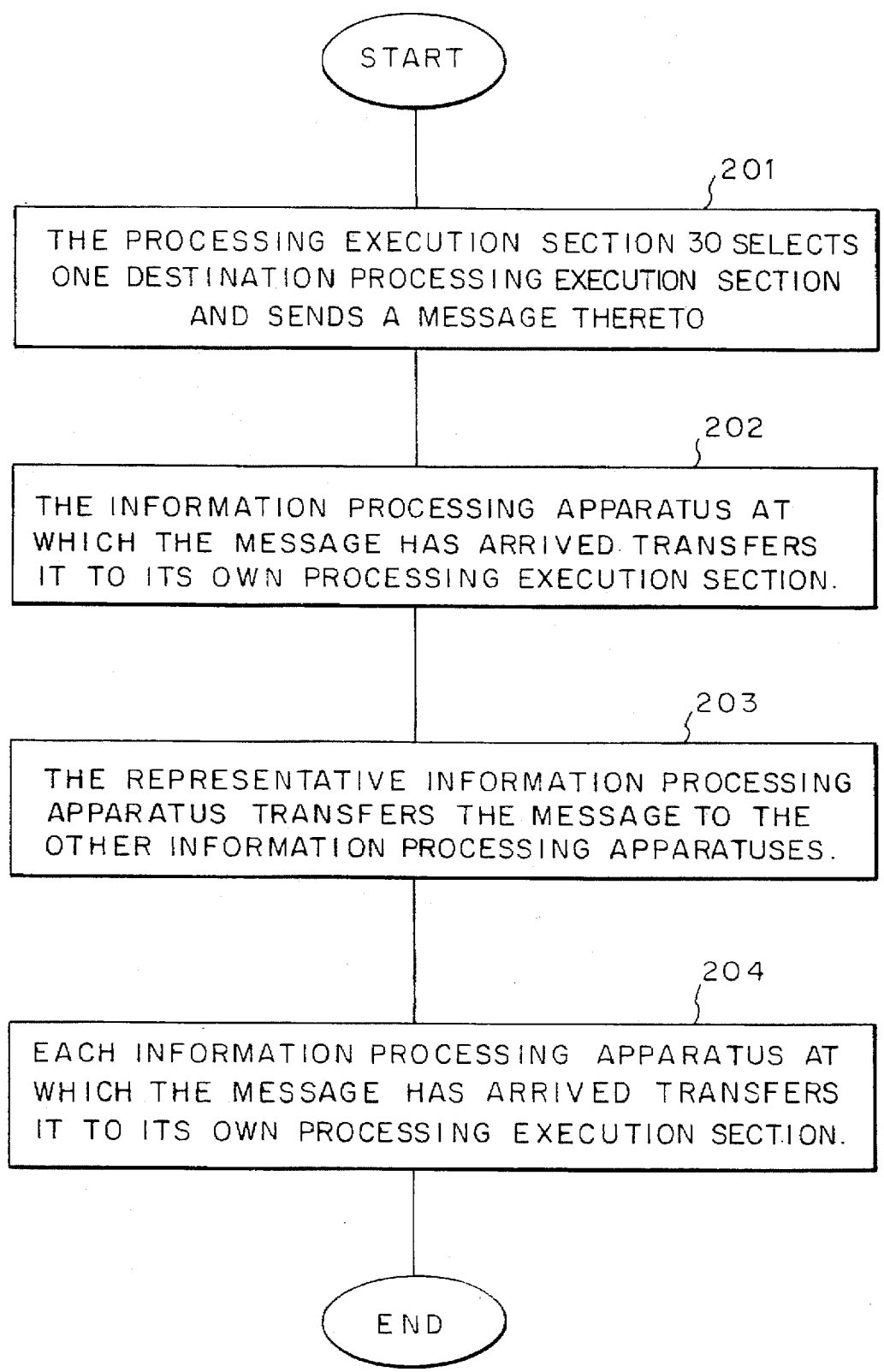
FIG. 2 is a flowchart indicating the processing procedure of the information processing apparatus for executing multi-cast processing in the first embodiment.

Referring to FIG. 2, there is shown a flowchart describing the steps of a computer program for a procedure for the processing of an information processing apparatus that executes the multi-cast processing in the above-mentioned first embodiment. The procedure is graphically illustrated by the arrows shown in FIG. 1.

The steps of the computer program illustrated in FIG. 2 and the steps of each of the computer programs described below correspond to sections of code written in a computer language such as C language. The computer program illustrated in FIG. 2 and each of the computer programs described below can be stored on a computer readable medium such as CD ROM, floppy disk, logic circuit or the like.

The steps of the computer program illustrated in FIG. 2 and the steps of each of the computer programs described below, when executed by an information processing apparatus operated as a receiver, are performed most efficiently when the information processing apparatus is a workstation having a Unix operating system or a PC having an OS2 or Windows95 operating systems. Particularly, the information processing apparatus operated as a receiver should provide a multi-tasking function through its operating system. The steps of the computer program illustrated in FIG. 2 and the steps of each of the computer programs described below, when executed by a PC operated as a receiver, is performed with some difficulty when the PC has a MS-DOS operating system since a multi-tasking function is not provided in MS-DOS.

The steps of the computer program illustrated in FIG. 2 and the steps of the computer programs described below, when executed by an information processing apparatus being operated as a sender, are performed most efficiently when the information processing apparatus ia workstation having a Unix operating system or a PC having a MS-DOS, OS2 or Windows95 operating system. The information processing apparatus when operated as a sender does not require a multi-tasking/ function.

First, the processing execution section 30, when transmission is to a group, arbitrarily selects one of the processing execution sections in the group, or a member of the group, and sends a message to the selected processing execution section 34 (step 201). The processing execution section 30 that sends the message may or may not be a member of the destination group. Although not shown in FIG. 1, the information processing apparatus in which the processing execution section 30 is arranged may include a member of the group to which the processing execution section 30 sends the message.

The information processing apparatus 2 that has received the message, hereinafter referred to as the representative information processing apparatus, transfers the received message to its own processing execution section 34 that belongs to the message destination group (step 202). Further, the representative information processing apparatus 2 transfers the received message to all other information processing apparatuses of the message destination group (step 203).

Each information processing apparatus that has received the message from the representative information processing apparatus transfers the received message to its own processing execution section that belongs to the message destination group (step 204). Thus, the message is multi-cast to the processing execution sections in the group.

For example, referring to FIG. 1, the information processing apparatuses 4 through 6 include the information processing execution sections 34, 35, 37 and 30 that belong to the same group to which the message is multi-cast from the execution processing section 30. The information processing apparatus 2 arbitrarily selects one of the processing execution sections of the destination group as a representative processing execution section. In this case the processing execution section 34 is selected for example. The information processing apparatus 2 sends the message to the information processing apparatus 4 having the representative processing execution section 34 (arrow 100).

The communication manager 22 included in the information processing apparatus 4 receives the message and transfers it to the representative processing execution section 34 of the information processing apparatus 4 (arrow 101) and, at the same time, sends the message to the information processing apparatuses 5 and 6 having non-representative processing execution sections 35, 36, 37 and 38 (arrows 102a and 102b). The communication managers 23 and 24 of the information processing apparatuses 5 and 6 that have received the message transfer it to the processing execution sections 35, and 37 and 38 respectively (arrows 103a, 103b, 103c).

The processing execution section 30 may or may not belong to the group constituted by the processing execution sections 34, 35, 37, and 38. Multi-casting to the group constituted by the processing execution sections 34, 35, 37, and 38 may also be performed from the processing execution section 31 or 32 in the same manner as the multi-casting from the processing execution section 30 described above.

Figure 3:
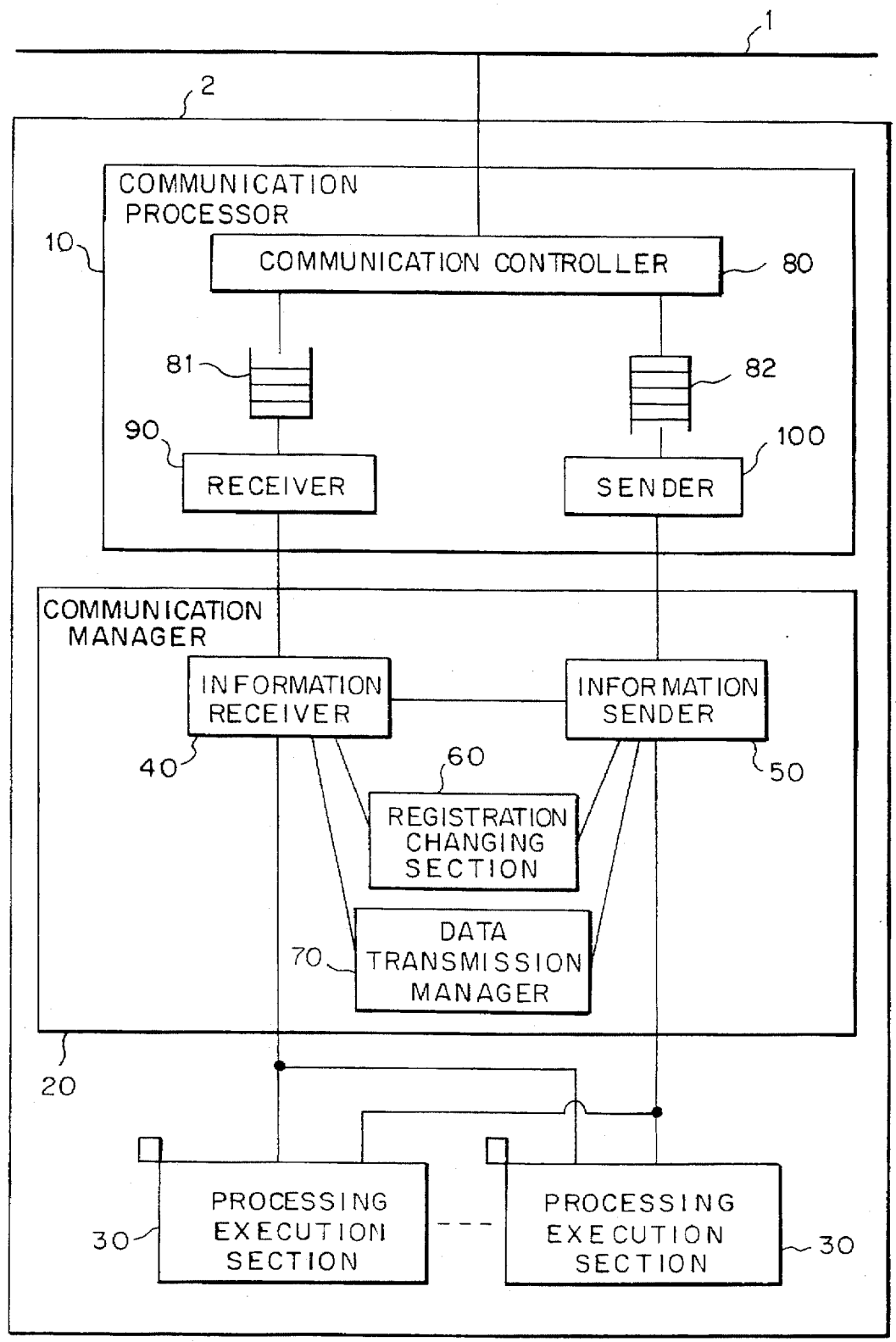
FIG. 3 is a block diagram illustrating the constitution of the information processing apparatus of FIG. 1.

Referring to FIG. 3, there is shown a block diagram illustrating the constitution of the information processing apparatus 2 of FIG. 1. In what follows, the constitution of the information processing apparatus will be described by using the information processing apparatus 2 for example. The other information processing apparatuses have the same constitution.

The information processing apparatus 2 includes the communication processor 10, the communication manager 20, and the processing execution section 30. The communication manager 10 includes a receiver 90 for receiving a message coming from another information processing apparatus, a sender 100 for performing message transmission, and communication controller 80 for controlling message sending to the communication medium 1 and message receiving therefrom. There is only one receiver 90 in the figure; however the receiver 90 may be provided in plural. The communication processor 10 also has a buffer 81 provided for the receiver 90. The buffer 81 may be provided in plural for one receiver 90. However, one buffer 81 corresponds to one receiver 90. Each buffer 81 is assigned with a buffer identifier by which the communication controller 80 identifies the buffer.

The functions and elements of the communication processor 10 may be embodied as one of the functions of the operating system being executed by the information processing apparatus.

The communication manager 20 contains an information receiver 40, an information sender 50, a registration changing section 60, and a data transmission manager 70. The communication manager 20 may be provided in plural for the communication processor 10. One communication manager 20 may correspond to a plurality of receivers 90; however, one receiver 90 corresponds to one communication manager 20. The communication manager 20 can be described as "middleware".

The processing execution section 30 belongs to a processing execution section group. The processing execution section 30 may take the form of plural processing execution sections. The single processing execution section 30 or the plural processing execution sections 30 each may be constituted by an application program.

Figures 4, 5:
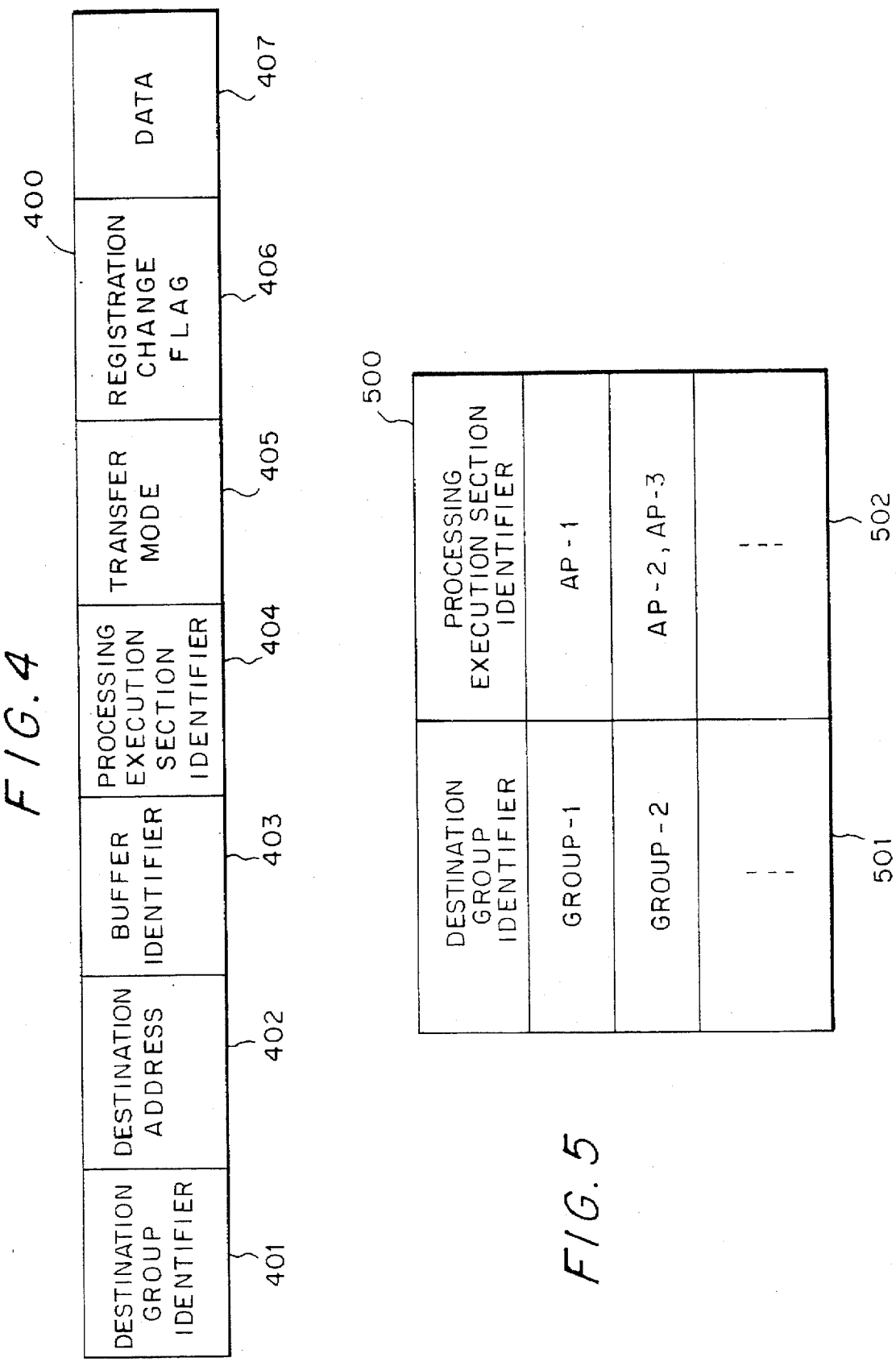
FIG. 4 is a diagram illustrating the format of the message to be transmitted via the communication medium.
FIG. 5 is a diagram illustrating the constitution of the receive information table held by the data transmission manager.

Referring to FIG. 4, there is shown a format of the message transmitted over the communication medium 1. As shown in FIG. 4, a message 400 has control information such as a destination group identifier part 401 for identifying a group of a destination processing execution section, a destination address part 402 holding an address of a destination information processing apparatus, a buffer identifier 403 for specifying a destination buffer, a processing execution section identifier part 404 for specifying the destination processing execution section, a transfer mode part 405 for indicating whether a destination communication manager further transfers this message to another information processing apparatus, a registration change flag 406 for indicating that this message is for adding or deleting an information processing apparatus, and a data part 407 for has holding data to be transmitted between the processing execution sections 30 of information processing apparatuses via the communication medium 1. Further, the message 400 includes information for detecting a communication error, which is not shown because it is not directly associated with the present invention.

The message coming over the communication medium 1 is received by the communication controller 80. The communication controller 80 references the destination address part 402 of the message 400 coming via the communication medium 1 and receives the message. The received message 400 is stored in the buffer 81 according to the buffer identifier 403 in the message 400. The receiver 90 reads the message from the buffer 81 and passes the read message to the information receiver 40. Upon reception of the message from the communication processor 10, the information receiver 40 determines to which of the processing execution sections the message is to be passed and whether to pass the message to the information sender. Finally, the received message is passed to the processing execution section 30 that actually uses the message to execute processing. From the information receiver 40 to the processing execution section 30, only the information stored in the data part 407 of the received message is passed.

The processing execution section 30 uses the data received from the information receiver 40 to perform specified processing. The processing execution section 30 of the first embodiment includes a user program and an application program created or used by the user. The processing execution section 30 also sends a result of the execution or a request for referencing information necessary for the processing to another information processing apparatus as required. In this case, the processing execution section 30 sends the information to be transmitted to the information sender 50 along with a group identifier of the destination.

It should be noted that some of the processing execution sections 30 may perform processing without using the data held in the message coming via the communication medium 1 or may not send the information such as the execution result via the communication medium 1.

The information sender 50 references the information held by the data transmission manager 70 and, based on the destination group identifier added to the information received from the processing execution section 30 or the information receiver 40, determines the destination of the received information and requests the sender 100 in the communication processor 10 for transmission processing. The information sender 50, when requesting the sender 100 for transmission, arranges the information to be sent according to the format of FIG. 4 before passing the information to the sender 100. Based on the transmission information sent from the information sender 50, the sender 100 transmits the message.

The registration changing section 60 updates the information held in the data transmission manager 70 when a change has taken place in the constitution of the processing execution section group such as addition of a new processing execution section to the group. Referring to FIG. 5, there is shown a constitution of a receive information table 500 held in the data transmission manager 70.

As shown in FIG. 5, the receive information table 500 lists the relationships between destination group identifiers (column 501) attached to messages to be captured by the information processing apparatus 2 and processing execution section identifiers (column 502) using the messages attached with the destination group identifiers. The receive information table 500 is referenced when the information receiver 40 passes the data held in messages received from the communication processor 10 to the processing execution section 30.

For example, referring to the receive information table 500 of FIG. 5, each message attached with "group-1" as the destination group identifier is sent to processing execution section "AP-1" and each message attached with "group-2" is sent to processing execution sections "AP-2" and "AP-3."

Referring to FIG. 6, there is shown a constitution of a transmission information table 510 held by the data transmission manager 70 along with the receive information table 500. The transmission information table 510 of FIG. 6 lists information for indicating where to send messages received by the information sender 50 from the processing execution section 30 or the information receiver 40.

To be specific, the transmission information table 510 is composed of a destination group identifier column 511 containing destination group identifiers for indicating groups of destination processing execution sections, a destination address column 512 containing addresses of destination information processing apparatuses, a buffer identifier column 513 containing destination buffer identifiers, and a processing execution section identifier column containing destination processing execution section identifiers.

For example, the transmission information table 510 of FIG. 6 indicates that each of the messages attached with destination group identifier "group-1" are transmitted with the destination address being "4235D," the buffer identifier being "21" and the processing execution section identifier being "AP-1," or the destination address being "147C6," the buffer identifier being "17" and the processing execution section identifier being "AP-2, " or the destination address being "3221F," the buffer identifier being "60" and the processing execution section identifier being "AP-3."

Next, the message send/receive processing to be realized by the above-described information processing apparatus will be described.

First, the processing of step 201 of FIG. 2, namely the processing procedure for sending messages to a group will be described.

If there is data that is a processing result to be notified to another information processing apparatus or an inquiry to the processing execution section of another information processing apparatus, the processing execution section 30 outputs the data as transmission information along with the specification of the group identifier of the destination processing execution section group.

Figure 7:
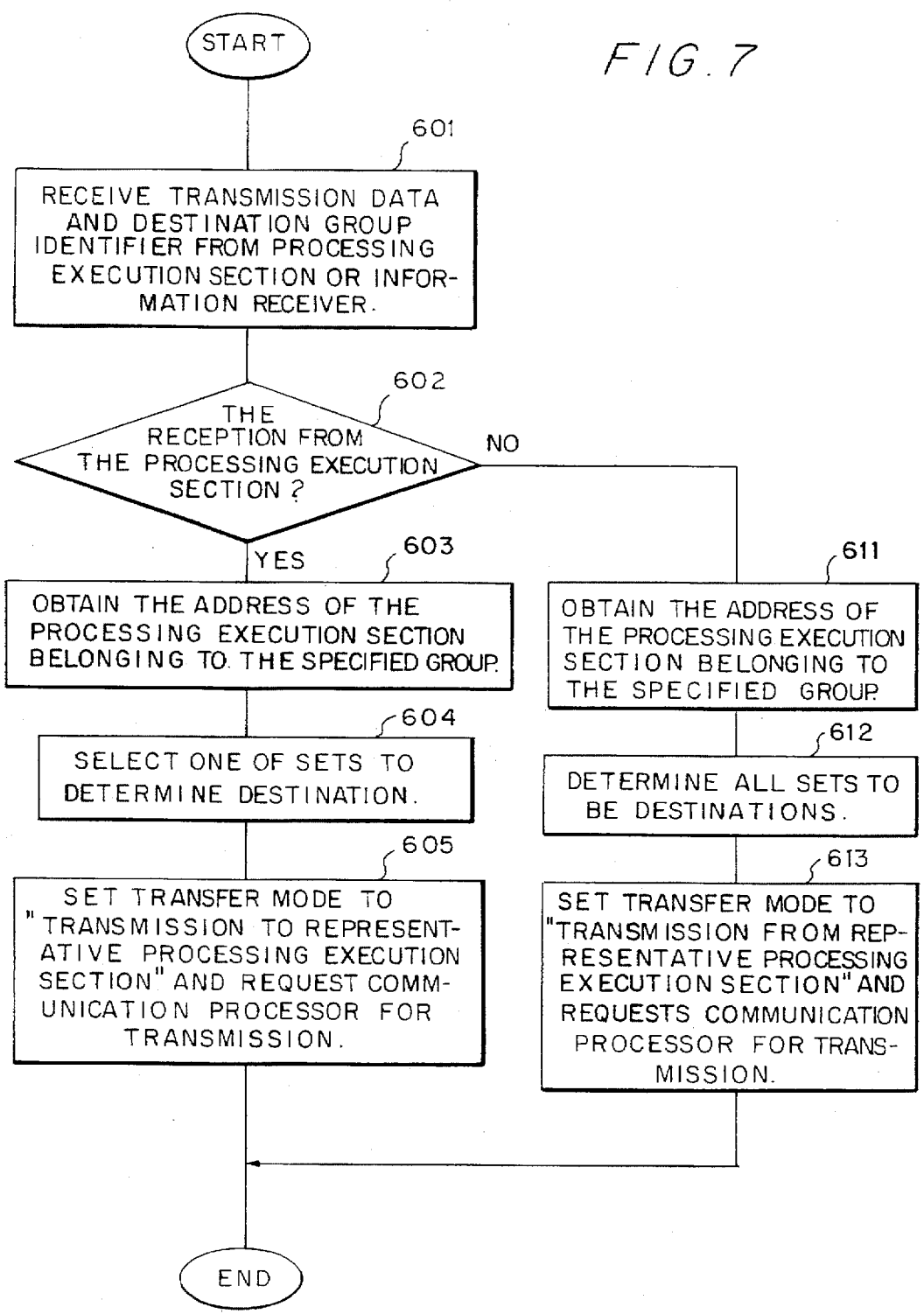
FIG. 7 is a flowchart indicating the processing procedure of the information sender when a message is sent to a group.

In the first embodiment, the transmission information output by the processing execution section 30 is passed to the information sender 50. Referring to FIG. 7, there is shown a flowchart of a computer program indicating the processing procedure of the information sender 50 when it sends a message to a group. The information sender 50 processes not only the messages received from the processing execution section 30 but also the messages received from the information receiver 40.

FIG. 7 also shows the processing procedure for messages received from the information receiver 40, which will be described later in the send/receive processing of the information processing apparatus having the representative processing execution section. First, the information sender 50 receives send data containing the specification of a destination group identifier from the processing execution section 30 or the information receiver 40 (step 601). Depending on whether the source of the send data is the processing execution section 30 or the information receiver 40, the subsequent processing branches (step 602).

If the send data is received from the processing execution section 30, the processing goes to step 603. Next, based on the specified destination group identifier, the transmission information table 510 in the data transmission manager 70 is referenced to determine the destination information processing apparatus and the destination processing execution section (step 603).

To be specific, based on the destination group identifier specified by the processing execution section 30, the transmission information table 510 is searched for a set of identifiers; the destination address entered in the destination address column 512, the buffer identifier entered in the buffer identifier column 513, and the processing execution section identifier entered in the processing execution section column 514 in the line that contains destination group column 511 in which the specified destination group identifier is entered. If such a set is found in plural, the information sender 50 selects any one of the sets as the representative processing execution section and makes it the destination (step 604). The information sender 50 passes a message along with the above-mentioned destination information, data 407 to be transmitted, and the transfer mode 405 specified in the "transmission to the representative processing execution section" to the sender 100 (step 605). Information in the transmission information table 510 controlled by the information processing apparatus having a processing execution section that belongs to a group is entered when the group is created.

Changing of the information held in the transmission information table 510 will be described later.

The sender 100 that has received the message coming from the information sender 50 creates, based on the received information, a message having the format of FIG. 4 to be transmitted over the communication medium 1 and stores the created message in a buffer 82. The message stored in the buffer 82 is fetched by the communication controller 80 to be transmitted over the communication medium 1.

In what follows, the processing of step 202 of FIG. 2 will be described; namely the processing to be performed by the representative information processing apparatus having the representative processing execution section at the time of message reception.

Figure 8:
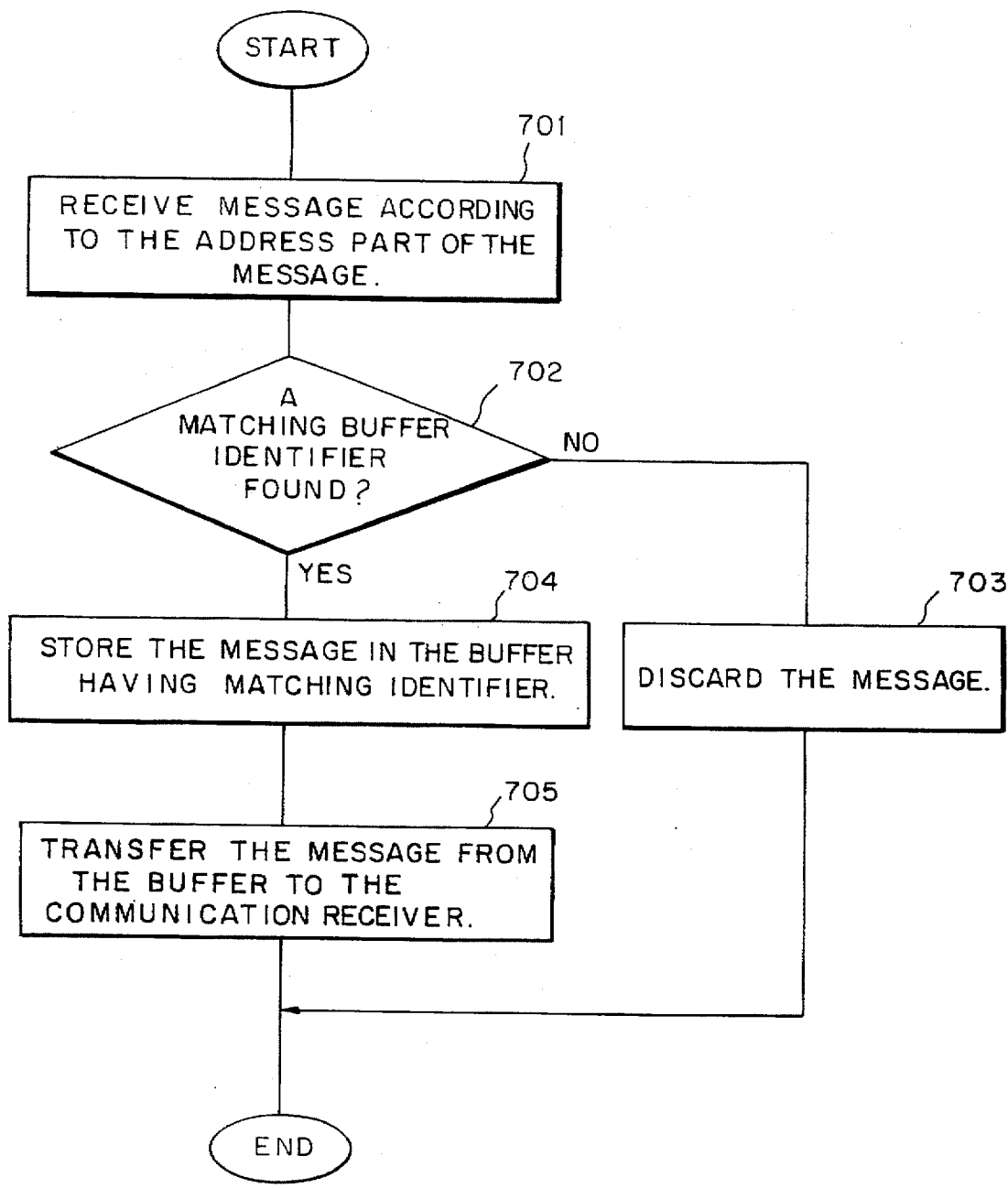
FIG. 8 is a flowchart indicating the processing procedure of the communication processor when the message has been received from the communication medium.

Referring to FIG. 8, there is shown a flowchart of a computer program indicating a processing procedure of the communication processor 10 when a message has been received from the communication medium 1. In the communication processor 10, the communication controller 80 checks the destination address set to the destination address part 402 of the message to be transmitted over the communication medium 1. The communication controller 80 receives the message if the destination address is the address assigned to itself (step 701).

Upon reception of the message, the communication controller 80 references the buffer identifier part 403 to check the buffer held in the communication controller 80 for a buffer assigned with a buffer identifier that matches the buffer identifier set to the buffer identifier part 403 (step 702). If no buffer assigned with the matching identifier is found, that message is discarded as unnecessary in the information processing apparatus concerned (step 703).

On the other hand, if the buffer having the matching identifier is found, the message that has received the buffer identifier is stored (step 704). In this case, the communication controller 80 stores the message by excluding the buffer identifier 405 from the format of FIG. 4. The resultant message stored in the buffer by the communication controller is transferred by the receiver 90 to the information receiver 40 (step 705).

Figure 9:
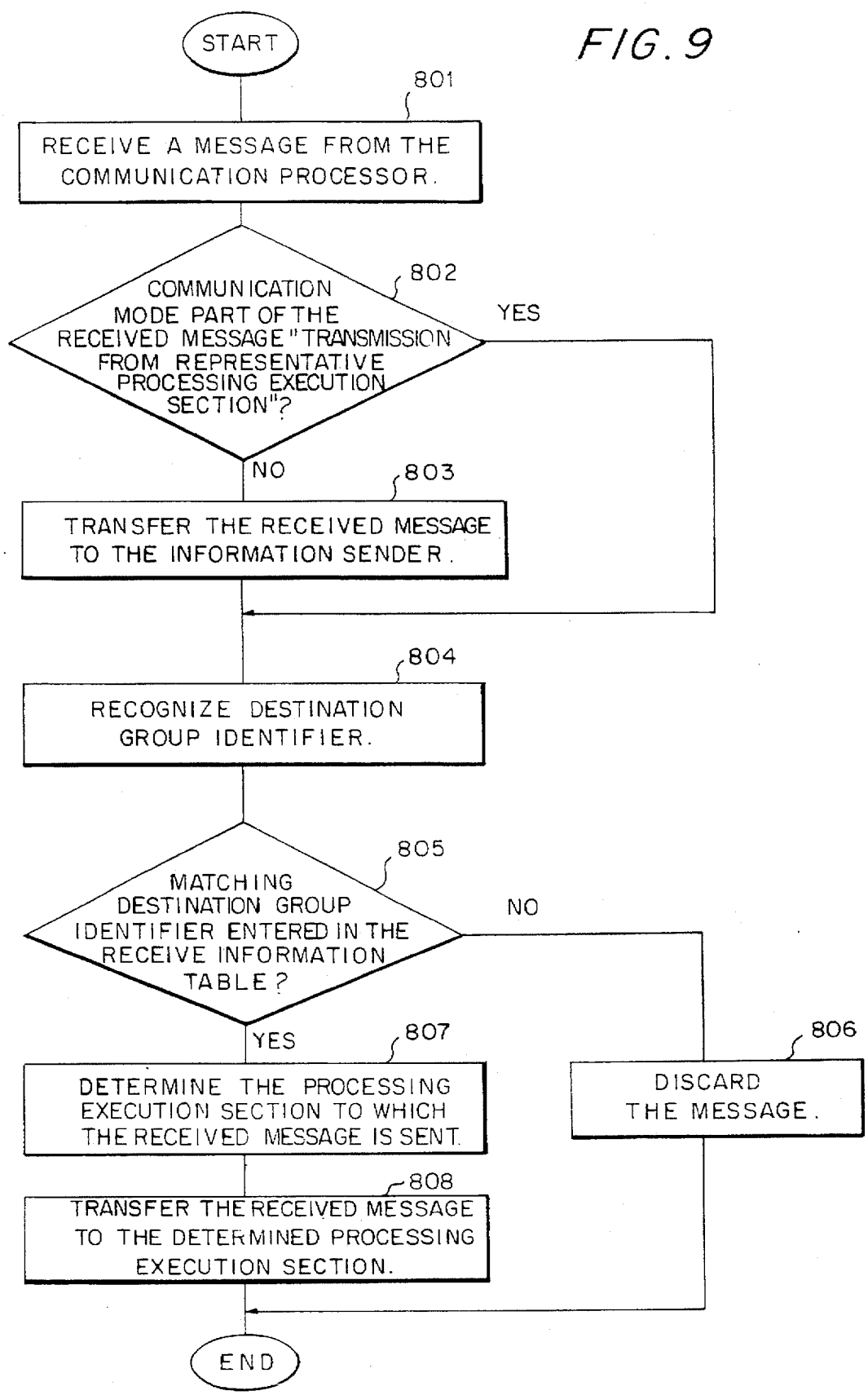
FIG. 9 is a flowchart indicating the processing procedure of the information receiver when the message has been received.

Referring to FIG. 9, there is shown a flowchart of a computer program indicating a processing procedure of the information receiver 40 when the message has been received.

Upon reception of the message from the communication processor 10 (step 801), the information receiver 40 references the transfer mode part 405 in the message to determine whether the transfer processing of the receive message is to be performed by itself (step 802). If the transfer mode part 405 is set to "transmission to representative processing execution section," the information receiver 40 duplicates the receive message and sends one of them to the information sender 50 (step 803). The processing to be performed in the information sender 50 will be described later. Next, the information receiver 40 references the destination group identifier part 401 in the message to recognize the destination group identifier attached to the message (step 804).

The information receiver 40 references the receive information table 500 in the data transmission manager 70 to determine to which processing execution section 30 the receive message is to be sent. In this determination, the information receiver 40 first searches the destination group identifier column 501 of the receive information table 500 for a destination group identifier that matches the recognized destination group identifier (step 805). If no matching destination group identifier is found, the information receiver 40 discards that message and ends the processing (step 806).

If the destination group identifier column in which the destination group identifier matching the recognized destination group identifier is entered has been found, the information receiver 40 determines the processing execution section entered in the processing execution section column 502 corresponding to the destination group identifier 501 to be the processing execution section to which the receive message is to be transferred (step 807). Then, the information receiver 40 transfers the message to the processing execution section 30 determined in step 807 and ends the processing (step 808).

The following describes the processing of step 203; namely the transfer of a message, by the information processing apparatus having the representative processing execution section, to all other information processing apparatuses at the time of message transmission.

As shown in FIG. 7, the information sender 50 first receives send data having the specification of a destination group identifier from the information receiver 40 (step 601). Based on the specified destination group identifier, the information sender 50 references the transmission information table 510 in the data transmission manager 70 to determine a destination information processing apparatus and a destination processing execution section (step 611).

To be specific, based on the destination group identifier specified by the processing execution section 30, the information sender 50 searches the transmission information table 510 for a set of a destination address entered in the destination address column 512, a buffer identifier entered in the buffer identifier column 513, and a processing execution section identifier entered in the processing execution section column 514 of the line that includes the destination group column 511 in which the specified destination group identifier is entered. If such a set is found in plural, the information sender 50 selects each of the sets as a destination processing execution section (step 612). However, if the address of the information processing apparatus itself is registered as an destination address, the information processing apparatus itself is excluded from the destination group.

The information sender 50 passes the message to the sender 100 along with the information of the selected destination processing execution section, data 407 to be transmitted, and the transfer mode 405 specified in "transmission from representative processing execution section" (step 613).

Upon receiving the message from the information sender 50, the sender 100 creates, from the received information, a message having the format of FIG. 4 to be transmitted over the communication medium 1 and stores the created message in the buffer 82. The message stored in the buffer 82 is fetched by the communication controller 80 to be transmitted over the communication medium 1.

Next, the processing of step 204 will be described; namely, the processing to be performed by the information processing apparatus having a non-representative processing execution section at the time of message reception.

The processing of step 204 is generally the same as the processing for message reception by the information processing apparatus having the representative processing execution section of FIG. 9. Therefore, in what follows, only differences will be described.

As described in the processing procedure for the message reception by the information processing apparatus having the representative processing execution section, the information receiver, upon reception of the message from the communication processor 10 (step 801), references the transfer mode part 405 in the message to determine the received message transfer processing to be performed by the information receiver 40 (step 802). If the transfer mode part 405 is set to "transmission to representative processing execution section," the information receiver 40 transfers the received message to the information sender 50 (step 803).

Since the transfer mode part 405 is set to "transmission from representative processing execution section" in the message sent to the non-representative processing execution section, the processing is performed with the received message not transferred to the information sender 50. Finally, the received message is transferred to the non-representative processing execution section of its own.

If, in the above-mentioned case, the processing execution section 30 that has sent transmission information sends the message to the group to which the processing execution section 30 belongs, the message is also transferred to the source processing execution section 30 but the message is discarded in the source processing execution section 30.

Of the pieces of information in the transmission information table 510 controlled by each information processing apparatus, the processing execution section identifier 514 may not provided. In that case, the representative information processing apparatus uses the information in the transmission information table 510 to obtain the address of the destination information transmission apparatus from the destination group identifier of the received message and sends the received message. In that case, nothing is specified to the processing execution section identifier 404 in the message.

The information processing apparatus that has received the message from the representative processing execution section searches its own receive information table 500 to determine to which processing execution section of its own the message is to be transferred. At this moment, if a plurality of processing execution section identifiers are entered for one group in the receive information table 500, the message is duplicated to be transferred to corresponding processing execution sections.

An information processing apparatus that sends a message to a group, the information processing apparatus 2 for example, may not specify the processing execution section identifier 404 in the message format when sending the message to the group. The representative processing execution section searches the transmission information table 510 in its own information processing apparatus to determine a destination information processing apparatus. At this time, the information processing apparatus may specify the destination processing execution based on its own transmission information table 510 or leave empty (null) the processing execution section identifier 404 of the send message without specifying the destination processing execution section. When the above-mentioned processing has been completed, multi-casting of the message to all processing execution sections belonging to the group is realized.

The following describes the processing to be performed when a processing execution section is newly added to a group.

The additional processing is performed in one of the following two methods: using the address manager 7 that manages the addresses of information processing apparatuses and processing execution sections and not using the address manager 7.

First, a processing procedure to be executed by each information processing apparatus will be described in which the address manager 7 that manages the addresses of information processing apparatuses and processing execution sections is used when a processing execution section has been newly added to a group.

Figure 10:
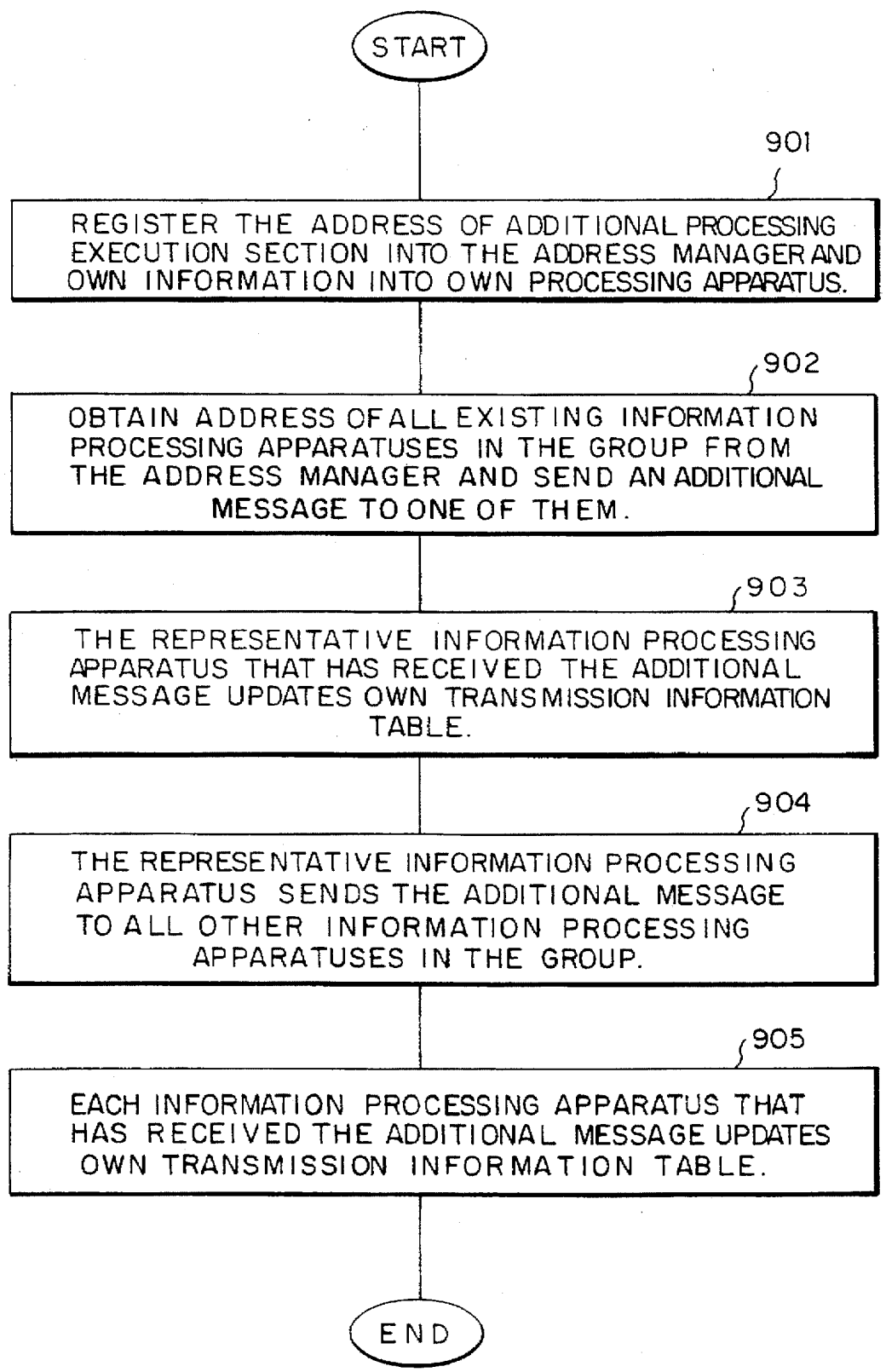
FIG. 10 is a flowchart indicating the processing procedure of each information processing apparatus to be executed when the address manager for managing the addresses of information processing apparatus and processing execution section is used when a processing execution section has been newly added to a group.

Referring to FIG. 10, there is shown a flowchart describing a computer program for the processing procedure executed by each information processing apparatus when the address manager 7 that manages the addresses of information processing apparatuses and processing execution sections is used and when a processing execution section has been newly added to a group.

The new processing execution section registers its own information into the receive information table 510 controlled by the data transmission manager of the information processing apparatus having the new processing execution section. The new processing execution section also registers its own address in the address manager 7 (step 901). Then, the information processing apparatus having the new processing execution section gets, from the address manager 7, the addresses of all processing execution sections belonging to the group to which the information processing apparatus belongs.

The new processing execution section arbitrarily selects one of the obtained processing execration section addresses, makes the information processing apparatus having the processing execution section having the selected address be the representative information processing apparatus, and sends an additional message to the representative information processing apparatus (step 902). The representative information processing apparatus that has received the additional message gets, from the address manager 7, the address of the processing execution section to be newly added and adds the address to the transmission information table managed by the data transmission manager 70 of the representative information processing apparatus (step 903). Then, the representative information processing apparatus sends the additional message to all information processing apparatuses having the processing execution sections registered in the transmission information table managed by its own data transmission manager 70 (step 904).

Finally, each information processing apparatus that has received the additional message gets, from the address manager 7, the address of the processing execution section to be newly added and adds the obtained address to the transmission information table managed by its own data transmission manager (step 905). Thus, according to the above-mentioned procedure, the new processing execution section is added to the group. Deletion of a processing execution section from a group is also performed in generally the same procedure as the above-mentioned procedure.

The following describes a processing procedure to be executed by each information processing apparatus in which the address manager 7 that manages the addresses of information processing apparatuses and processing execution sections is not used when a processing execution section has been newly added to a group.

Figure 11:
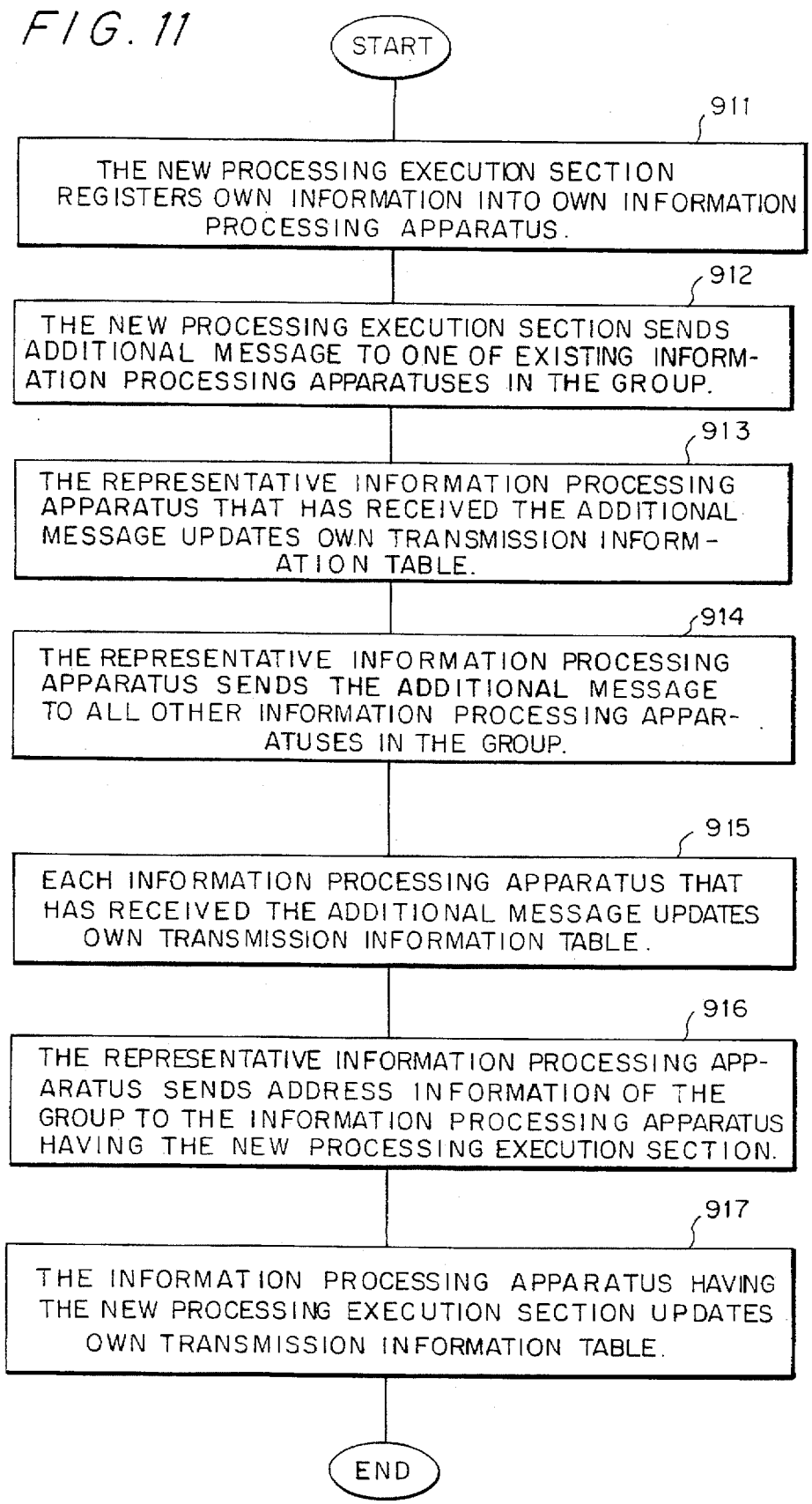
FIG. 11 is a flowchart indicating the processing procedure of each information processing apparatus to be executed when the address manager for managing the addresses of information processing apparatus and processing execution section is not used when a processing execution section has been newly added to a group.

Referring to FIG. 11, there is shown a flowchart of a computer program indicating the processing procedure by each information processing apparatus when the address manager 7 that manages the addresses of information processing apparatuses and processing execution sections is not used when a processing execution section has been newly added to a group.

The new processing execution section registers its own information in the receive information table 500 of its information processing apparatus (step 911). The new processing execution section sends an additional message containing its own address information to the information processing apparatus (representative information processing apparatus) 1 having the processing execution section belonging to the group to which the new processing execution section belongs (step 912).

The representative processing execution section that has received the additional message registers the address of the new processing execution section contained in the additional message into its transmission information table (step 913). The representative information processing apparatus sends the additional message to all information processing apparatuses having the processing execution sections registered in its own transmission information table as group members (step 914).

Each information processing apparatus that has received the additional information from the representative information processing apparatus registers the address of the new processing execution section contained in the additional message into its own transmission information table (step 915). The representative processing execution section sends group address information registered in the transmission information table 510 managed by itself to the information processing apparatus having the new processing execution section (step 916).

The information processing apparatus having the new processing execution section registers the received group address information of the processing execution section into the transmission information table 510 of the information processing apparatus having the new processing execution section (step 917). Thus, according to the above-described procedure, the process of adding a new processing execution section to a group is performed without using the address manager 7.

Regardless of whether the address manager 7 is used or not used, if the transmission information table 510 contains no processing execution section identifier 514, the processing execution section to be newly added to a group registers itself in the receive information table 500 to end the adding processing if a processing execution section belonging to the group to which the new processing execution section is to belong has already been registered in the receive information table 500 of the information processing apparatus of the new processing execution section. Deletion of a processing execution section from a group is also performed by generally the same procedure as the above-described procedure regarding the addition of a processing execution section.

In the first embodiment, the description has been made referring to the grouping on a processing execution section basis. It should be noted that the grouping may be made on an information processing apparatus basis. In this case, the same processing is executed as the processing executed when a plurality of processing execution sections in one information processing apparatus belong to the same group as with the first embodiment. Also in the above-described case, the receive information table 500 of FIG. 5 is not necessary.

In the first embodiment, a processing execution section arbitrarily selected by the processing execution section 30 that sends a message to a group becomes the representative processing execution section and a plurality of processing execution sections that send messages to the group may select different representative processing execution sections.

In a second embodiment, the representative processing execution section of a group is predetermined and the plurality of processing execution sections that send messages to the group always send the messages to the same representative processing execution section. In the second embodiment, the constitution of the units making up the second embodiment are generally the same as those of the first embodiment. In what follows, only the differences between the first and second embodiments will be described.

In the second embodiment, the destination processing execution section when processing execution sections send messages to the group is not one that has been selected arbitrarily. The destination processing execution section is the representative processing execution section predetermined in the group. All information processing apparatuses having the processing execution sections that send messages to the group, send messages to the information processing apparatus that has the representative processing execution section of the group.

In the second embodiment, there is a limitation that each information processing apparatus having the processing execution section that sends a message to the group needs to know the address of the information processing apparatus having the representative processing execution section of the group. However, of the information processing apparatuses having the processing execution sections constituting the group, the information processing apparatus having the representative processing execution section needs to know the addresses of all other non-representative processing execution sections but each information processing apparatus having non-representative processing execution sections needs to know only the address of the representative processing execution section.

In the second embodiment, a new processing execution section is added in generally the same manner as the first embodiment. However, a difference from the first embodiment is that the new processing execution section always needs to send its additional message to the representative processing execution section in the group.

In the second embodiment, the grouping may be made on an information processing apparatus basis like the first embodiment.

In the above-mentioned second embodiment, the representative processing execution section is predetermined in a group and a plurality of processing execution sections that send messages to the group must always send them to the same representative processing execution section.

In a third embodiment, the representative processing execution section is predetermined in a group but the representative execution section may be selected by the processing execution section 30 that sends a message to the group to be the arbitrarily selected processing execution section and the plurality of processing execution sections that send messages to the group may select different processing execution sections as destinations. It should be noted that whether the representative processing execution section in the group is provided in its own information processing apparatus or not is programmed in the communication processing in advance.

The third embodiment is advantageous in that the processing execution sections that send messages to the group need not know the address of the representative processing execution section. In the third embodiment, the configurations of the units making up the third embodiment are generally the same as those of the first embodiment and therefore only differences between the first and second embodiments will be described below.

Figure 12:
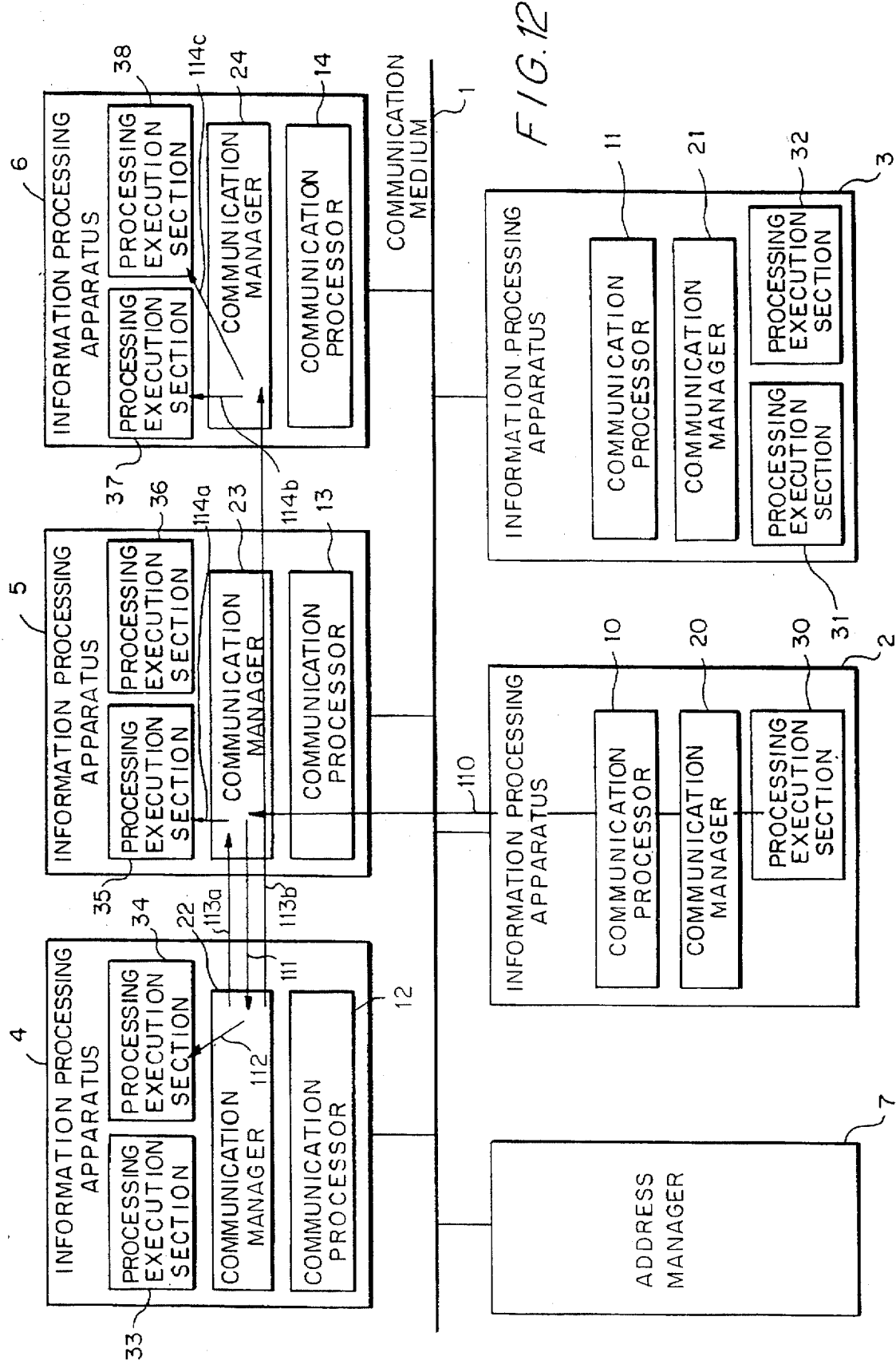
FIG. 12 is a block diagram illustrating the flow of a message to a group when the message is sent to the information processing apparatus having no representative processing execution section in a third embodiment of the invention.

Referring to FIG. 12, there is shown a block diagram illustrating how a message to a group flows when the message is sent to an information processing apparatus having no representative processing execution section. The information processing apparatuses 4 through 6 have processing execution sections 34, 35, 37 and 38 that belong to the same group. FIG. 12 shows the flow of messages during multi-cast from the processing execution section 30 to the processing executions sections 34, 35, 37 and 38 constituting the same group.

The information processing apparatus 2 arbitrarily selects one of the processing execution sections of the destination group; for example, the processing execution section 35.

The information processing apparatus 2 sends a message to the information processing apparatus 5 having the representative processing execution section 35 (arrow 110).

The communication manager 23 of the information processing apparatus 5 receives the message and transfers it to the information processing apparatus having the representative processing execution section 34 (arrow 111). The information processing apparatus 4 transfers the message to its processing execution section 34 (arrow 112) and, at the same time, sends the message to the information processing apparatuses 5 and 6 having non-representative processing execution sections 35, 37 and 38 (arrows 113a and 113b). Receiving the message, the communication managers 23 and 24 of the information processing apparatuses 5 and 6 transfer the message to the processing execution sections 35, 37 and 38 (arrows 114a, 114b and 114c).

Figure 13:
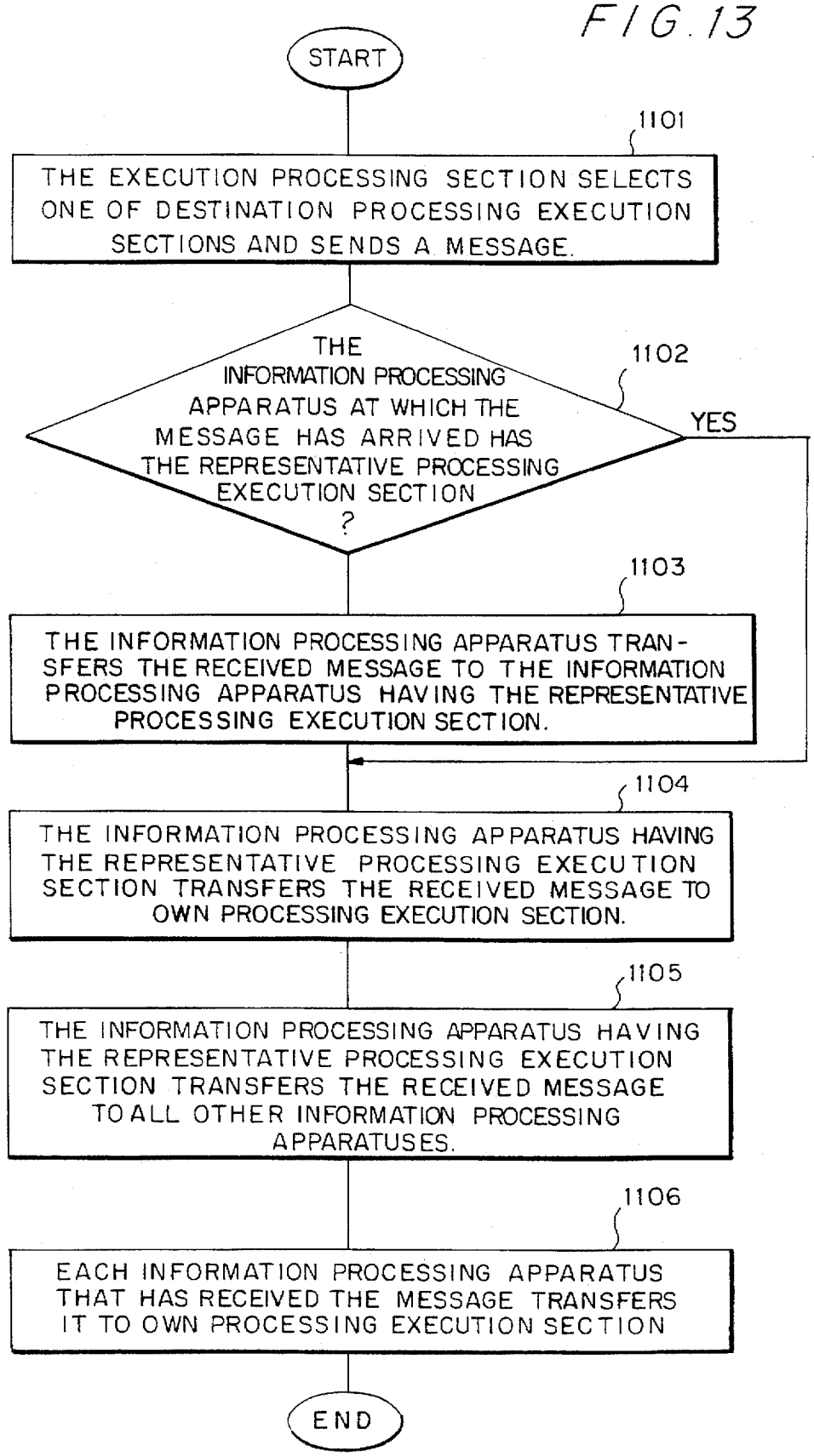
FIG. 13 is flowchart indicating the processing procedure of the information processing apparatus that executes the multi-cast processing in the third embodiment.

Referring to FIG. 13, there is shown a flowchart of a computer program indicating a processing procedure of the information processing apparatus to execute the multi-cast processing of the third embodiment. First, the processing execution section 30, to send a message to the group, arbitrarily selects one of the processing execution sections 30 that are members in the group and sends the message to the selected processing execution section 30 (step 1101). If the information processing apparatus that has received the message has the representative processing execution section, the processing goes to step 1104 (step 1102); otherwise, the message is transferred to the information processing apparatus having the representative processing execution section (step 1103).

The information processing apparatus having the representative processing execution section receives the message and transfers the received message to its own processing execution section belonging to the message destination group (step 1104). At the same time, the information processing apparatus having the representative processing execution section sends the received message to processing execution sections of the other information processing apparatuses that belong to the message destination group (step 1305).

The information processing apparatus that has received the message from the representative processing execution section transfers the received message to its own processing execution section belonging to the message destination group (step 1306). Thus, the message is multi-cast to the processing execution sections in the group.

It should be noted that, in the third embodiment, grouping may be made on an information processing apparatus basis as with the first embodiment.

As for the foregoing embodiments, the multi-cast processing on a one-to-many basis has been described. A fourth embodiment providing one-to-many request reply processing based on multi-cast processing will be described. The one-to-many request reply processing according to the fourth embodiment may be realized by using any of the foregoing embodiments. In what follows, the case in which the first embodiment is used will be described.

Figure 14:
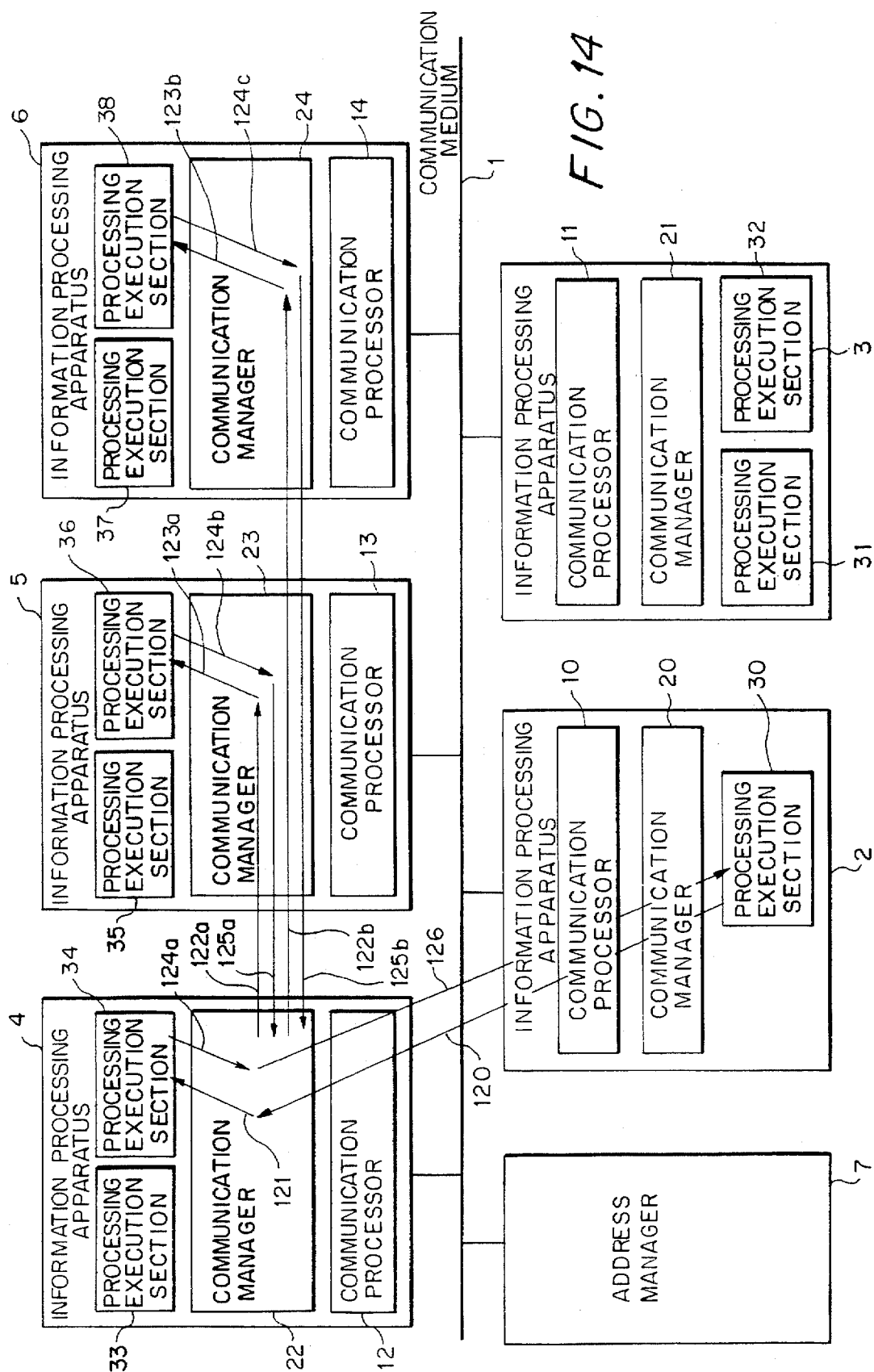
FIG. 14 is a diagram illustrating the flow of the messages in a fourth embodiment of the invention.

Referring to FIG. 15, there is shown a flowchart of a computer program indicating a processing procedure of an information processing apparatus that executes the request reply processing in the fourth embodiment. In FIG. 14, the information processing apparatuses 4 through 6 have the processing execution sections 34, 35, and 37 respectively. FIG. 14 shows a flow of a message in the request reply processing from the processing execution section 30 to the processing execution sections 34, 35 and 37 that constitute a group. It should be noted that the processing execution sections 34, 35 and 37 may not be ones that send a reply message, a result of the processing for a received request message.

The information processing apparatus 2 sends a request message to the processing execution sections 34, 35 and 37 by means of the multi-cast processing of the first embodiment (step 1301, arrows 120, 121, 122a, 122b, 123a and 123b). The processing execution sections 234, 35 and 37 that have received the request message perform the processing respectively (step 1302). The processing execution section or sections that send a processing result send it as reply messages to the information processing apparatus having the representative processing execution section 34 (step 1303, arrows 124a, 124b, 124c, 125a and 125b).

The communication manager 22 in the information processing apparatus 4 that has received the messages selects one of them and sends the selected message to the processing execution section 30, the source of the request message (step 1304, arrow 126). The processing execution section 30, the source of the request message, receives the replay message (step 1305).

In step 1304, the information processing apparatus 4 that has received the plurality of reply messages may send all of them to the processing execution section 30, the source of the request message. Of the processing execution sections that have received the request message, the processing execution section that sends the reply message may send it to the processing execution section 30, the source of the request message, rather than the information processing apparatus 4 having the representative processing execution section 34. In this case, the communication manager 20 in the information processing apparatus 2 having the processing execution section 30, the source of the request message, receives the plurality or reply messages. One of all of the reply messages are transferred to the source processing execution section 30.

As mentioned above and according to the present invention, the transmission load of the sending information processing apparatus is mitigated in the data transmission of an information processing system, realizing effective multi-casting even when the throughput of the sending information processing apparatus is low or the memory thereof is small in capacity.

Further, according to the present invention, in the data transmission of the information processing system, the total number of communication paths to be set is made relatively small if the number of information processing apparatuses that send data to a group is larger than the number of information processing apparatuses that belong to the group and each of the communication paths is set between two of the information processing apparatuses. Further, the sending information processing apparatus may multi-cast data to a group of information processing apparatuses always in the same transmission processing regardless in the group constitution of the destination.

Still further, according to the present invention, in the data transmission of the information processing system, if a change occurs in the system configuration such as a change in group configuration, the processing for the change may be effected only by changing the address information in the group managed by each receiving information processing apparatus. Therefore, the sending information processing apparatus may perform multi-casting on the group always in the same transmission processing and cope with the change on-line.

Still further, yet according to the present invention, in the data transmission of the information processing system, when making a request for requiring a plurality of information processing apparatuses for a reply, the representative information processing apparatus selects one of a plurality of response information pieces to respond to the requesting information processing apparatus, so that it is not necessary for the requesting information processing apparatus to receive the response information from all receiving information processing apparatuses, which is conventionally practiced.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A communication method performed in an information processing system including a plurality of information processing apparatuses, said plurality of information processing apparatus being grouped into a plurality of groups, and a communication line for interconnecting said plurality of information processing apparatuses, said communication method comprising the steps of:

when sending information from a sending information processing apparatus to others of a plurality of information processing apparatuses of a group, selecting, by said sending information processing apparatus, one information processing apparatus from said plurality of information processing apparatuses of said group as a representative information processing apparatus;

sending, by said sending information processing apparatus, said transmission information to said representative information processing apparatus;

receiving said transmission information in said representative information processing apparatus; and sending said transmission information from said representative information processing apparatus to any other information processing apparatuses in said group to which said representative information processing apparatus belongs.

2. A communication method performed in an information processing system including a plurality of information processing apparatuses, each having at least one processing execution section, said plurality of processing execution sections being grouped into a plurality of groups, and a communication line for interconnecting said plurality of information processing apparatuses, said communication method comprising the steps of:

when sending information from a sending processing execution section of a sending information processing apparatus to a plurality of processing execution sections of others of said plurality of information processing apparatuses in a group, selecting, by said sending information processing apparatus, any one of said plurality of processing execution sections of said group as a representative processing execution section;

sending, by said sending information processing apparatus, said transmission information to an information processing apparatus having said representative processing execution section;

receiving said transmission information in said information processing apparatus having said representative processing execution section; and sending, from said information processing apparatus having said representative processing execution section, said transmission information to any other information processing apparatuses having said processing execution sections in said group to which said representative processing execution section belongs.

3. A communication method of an information processing system according to claim 2, wherein each of said plurality of information processing apparatuses has an information storage section for storing information about a destination information processing apparatus to which said transmission information is to be transferred, said information processing apparatus having said representative processing execution section receives change information of a group of processing execution sections indicating a change in information stored in said information storage section and sends resultant change information to the information processing apparatuses having said processing execution sections of said group to which said representative processing execution section belongs, and each of said information processing apparatuses not having said representative processing execution section receives said resultant change information and changes information stored in said information storage section.

4. A communication method of an information processing system according to claim 2, wherein one processing execution section of one of said plurality of information processing apparatuses sends request information for requesting processing execution sections of a group for reply information, the information processing apparatuses having said processing execution sections of said group having received said request information returns reply information to said information processing apparatus having said representative processing execution section, and said information processing apparatus having said representative processing execution section gathers said reply information and returns one or all pieces of said reply information to said information processing apparatus having said processing execution section that sent said request information.

5. A communication method performed in an information processing system including a plurality of information processing apparatuses each having at least one processing execution section, said plurality of information processing apparatus being grouped into a plurality of groups, said plurality of processing execution sections being grouped into a plurality of groups, and a communication line for interconnecting said plurality of information processing apparatuses, said communication method comprising the steps of:

when sending information from a sending processing execution section of a sending information processing apparatus to a plurality of processing execution sections of others of said plurality of information processing apparatuses in a group, sending, by said sending information processing apparatus, transmission information to an information processing apparatus having a processing execution section arbitrarily selected from a plurality of processing execution sections of said group;

receiving said transmission information in an information processing apparatus having said arbitrarily selected processing execution section;

transferring, by said information processing apparatus having said arbitrarily selected processing execution section, if said information processing apparatus having said arbitrarily selected processing execution section does not have said representative processing execution section of said group, said transmission information to an information processing apparatus having said representative processing execution section; and sending, by said information processing apparatus having said representative processing execution section, when said transmission information has been received by said information processing apparatus having said representative processing execution section, said transmission information to other information processing apparatuses having said processing execution sections of said group to which said representative processing execution section belongs.

6. A communication method of an information processing system according to claim 5, wherein each of said plurality of information processing apparatuses has an information storage section for storing information about a destination information processing apparatus to which said transmission information is to be transferred, said information processing apparatus having said representative processing execution section receives change information of a group of processing execution sections indicating a change in information stored in said information storage section and sends resultant change information to the information processing apparatuses having said processing execution sections of said group to which said representative processing execution section belongs, and each of said information processing apparatuses not having said representative processing execution section receives said resultant change information and changes information stored in said information storage section.

7. A communication method of an information processing system according to claim 5, wherein one processing execution section of one of said plurality of information processing apparatuses sends request information for requesting processing execution sections of a group for reply information, the information processing apparatuses having said processing execution sections of said group having received said request information returns reply information to said information processing apparatus having said representative processing execution section, and said information processing apparatus having said representative processing execution section gathers said reply information and returns one or all pieces of said reply information to said information processing apparatus having said processing execution section that sent said request information.

8. A communication method of an information processing system according to claim 5, wherein one processing execution section of one of said plurality of information processing apparatuses sends request information for requesting processing execution sections of a group for reply information, the information processing apparatuses having said processing execution sections of said group having received said request information returns reply information to said information processing apparatus having said representative processing execution section, and said information processing apparatus having said representative processing execution section gathers said reply information and returns one or all pieces of said reply information to said information processing apparatus having said processing execution section that sent said request information.

9. An information processing system, comprising:
  a plurality of information processing apparatuses, each having at least one processing execution section, said plurality of processing execution sections being grouped into a plurality of groups; and
  a communication line for interconnecting said plurality of information processing apparatuses;
  wherein, a sending information processing apparatus, when sending information from a sending processing execution section to a plurality of other processing execution sections of said plurality of information processing apparatuses in a group, sends transmission information to one of said plurality of information processing apparatuses, and said one information processing apparatus that has received said transmission information sends said transmission information to said other information processing apparatuses of said group;
  wherein each information processing apparatus comprises:
    means for arbitrarily selecting one of said plurality of processing execution sections in said group as a representative processing execution section and sending transmission information coming from one of said plurality of processing execution sections to said information processing apparatus having said representative processing execution section along with an identifier for indicating a destination group,
    means for receiving said transmission information and transmitting, based on said identifier for indicating the destination group attached to the transmission information, said transmission information to said processing execution section included in said destination group in said information processing apparatus, and
    means for transferring, based on said identifier for indicating said destination group attached to said transmission information, said transmission information to other information processing apparatus having processing execution sections in said group.

10. An information processing system according to claim 9, wherein each information processing apparatus comprises:
  an information storage section for storing information about a destination information processing apparatus to which said transmission information is to be transferred;
  wherein said information processing apparatus having said representative processing execution section comprises:
    means for receiving change information of a group of processing execution sections and changing said information stored in said information storage section of said information processing apparatus, and
    means for sending said change information to said information processing apparatuses having said processing executions sections of said group; and
  wherein each of said information processing apparatuses not having said representative processing execution section comprises:
    means for receiving said change information and changing said information stored in said information storage section of said information processing apparatus.

11. An information processing system according to claim 9, wherein each information processing apparatus comprises:
  means for sending request information for requesting processing execution sections in a group for reply information;
  wherein each information processing apparatus having a processing execution section that has received said request information comprises:
    means for returning said reply information to said information processing apparatus having said representative processing execution section; and
  wherein said information processing apparatus having said representative processing execution section comprises:

means for gathering said reply information and returning one or all pieces of said reply information to said information processing apparatus having said processing execution section that sent said request information.

12. A computer program for execution in an information processing system having a plurality of information processing apparatuses, said plurality of information processing apparatus being grouped into a plurality of groups, and a communication line for interconnecting said plurality of information processing apparatuses, comprising:

a computer readable medium having stored thereon said computer program including:

a first code section for, when sending information from a sending information processing apparatus to others of a plurality of information processing apparatuses of a group, selecting, by said sending information processing apparatus, one information processing apparatus from said plurality of information processing apparatuses of said group as a representative information processing apparatus;

a second code section for sending, by said sending information processing apparatus, said transmission information to said representative information processing apparatus;

a third code section for receiving said transmission information in said representative information processing apparatus; and a fourth code section for sending said transmission information from said representative information processing apparatus to any other information processing apparatuses in said group to which said representative information processing apparatus belongs.

13. A computer program for execution in an information processing system including a plurality of information processing apparatuses each having at least one processing execution section, said plurality of processing execution sections being grouped into a plurality of groups, and a communication line for interconnecting said plurality of information processing apparatuses, comprising:

a computer readable medium having stored thereon said computer program including:

a first code section for, when sending information from a sending processing execution section of a sending information processing apparatus to a plurality of processing execution sections of others of said plurality of information processing apparatuses in a group, selecting, by said sending information processing apparatus, any one of said plurality of processing execution sections of said group as a representative processing execution section;

a second code section for sending, by said sending information processing apparatus, said transmission information to an information processing apparatus having said representative processing execution section;

a third code section for receiving in said information processing apparatus having said representative processing execution section said transmission information; and a fourth code section for sending, from said information processing apparatus having said representative processing execution section, said transmission information to any other information processing apparatuses having said processing execution sections in said group to which said representative processing execution section belongs.

14. A computer program for execution in an information processing system according to claim 13, wherein each of said plurality of information processing apparatuses has an information storage section for storing information about a destination information processing apparatus to which said transmission information is to be transferred, said information processing apparatus having said representative processing execution section receives change information of a group of processing execution sections indicating a change in information stored in said information storage section and sends resultant change information to the information processing apparatuses having said processing execution sections of said group to which said representative processing execution section belongs, and each of information processing apparatuses not having said representative processing execution section receives said resultant change information and changes information stored in said information storage section.

15. A computer program for execution in an information processing system according to claim 13, wherein one processing execution section of one of said plurality of information processing apparatuses sends request information for requesting processing execution sections of a group for reply information, the information processing apparatuses having said processing execution sections of said group having received said request information returns reply information to said information processing apparatus having said representative processing execution section, and said information processing apparatus having said representative processing execution section gathers said reply information and returns one or all pieces of said reply information to said information processing apparatus having said processing execution section that sent said request information.

16. A computer program for execution in an information processing system including a plurality of information processing apparatuses each having at least one processing execution section, said plurality of information processing apparatuses being grouped into a plurality of groups, said plurality of processing execution sections being grouped into a plurality of groups, and a communication line for interconnecting said plurality of information processing apparatuses, comprising:

a computer readable medium having stored thereon said computer program including:

a first code section for, when sending information from a sending processing execution section of a sending information processing apparatus to a plurality of processing execution sections of others of said plurality of information processing apparatuses in a group, sending, by said sending information processing apparatus, transmission information to an information processing apparatus having a processing execution section arbitrarily selected from a plurality of processing execution sections of said group;

a second code section for receiving, in an information processing apparatus having said arbitrarily selected processing execution section, said transmission information;

a third code section for transferring, by said information processing apparatus having said arbitrarily selected processing execution section, if said information processing apparatus having said arbitrarily selected processing execution section does not have said representative processing execution section of said group, said transmission information to an information processing apparatus having said representative processing execution section; and a fourth code section for sending, by said information processing apparatus having said representative processing execution section, when said transmission information has been received by said information processing apparatus having said representative processing execution section, said transmission information to other information processing apparatuses having said processing execution sections of said group to which said representative processing execution section belongs.

17. A computer program for execution in an information processing system according to claim 16, wherein each of said plurality of information processing apparatuses has an information storage section for storing information about a destination information processing apparatus to which said transmission information is to be transferred, said information processing apparatus having said representative processing executive section receives change information of a group of processing execution sections indicating a change in information stored in said information storage section and sends resultant change information to the information processing apparatuses having said processing execution sections of said group to which said representative processing execution section belongs, and each of information processing apparatuses not having said representative processing executive section receives said resultant change information and changes information stored in said information storage section.

18. A computer program for execution in an information processing system according to claim 16, wherein one processing execution section of one of said plurality of information processing apparatuses sends request information for requesting processing execution sections of a group for reply information, the information processing apparatuses having said processing execution sections of said group having received said request information returns reply information to said information processing apparatus having said representative processing execution section, and said information processing apparatus having said representative processing execution section gathers said reply information and returns one or all pieces of said reply information to said information processing apparatus having said processing execution section that sent said request information.

* * * * *